(12) United States Patent
Sakata et al.

(10) Patent No.: US 9,626,110 B2
(45) Date of Patent: Apr. 18, 2017

(54) METHOD FOR SELECTING A PAGE FOR MIGRATION BASED ON ACCESS PATH INFORMATION AND RESPONSE PERFORMANCE INFORMATION

(71) Applicant: Hitachi, Ltd., Tokyo (JP)

(72) Inventors: Hironobu Sakata, Tokyo (JP); Hideo Ohata, Tokyo (JP); Naoshi Maniwa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 14/428,000

(22) PCT Filed: Feb. 22, 2013

(86) PCT No.: PCT/JP2013/054463
§ 371 (c)(1),
(2) Date: Mar. 13, 2015

(87) PCT Pub. No.: WO2014/128910
PCT Pub. Date: Aug. 28, 2014

(65) Prior Publication Data
US 2015/0248245 A1    Sep. 3, 2015

(51) Int. Cl.
*G06F 3/06* (2006.01)
*G06F 13/10* (2006.01)
(Continued)

(52) U.S. Cl.
CPC .............. *G06F 3/0611* (2013.01); *G06F 3/06* (2013.01); *G06F 3/0635* (2013.01);
(Continued)

(58) Field of Classification Search
None
See application file for complete search history.

(56) References Cited

U.S. PATENT DOCUMENTS 6,145,028 A * 11/2000 Shank ................... G06F 3/0607
710/31
2004/0162958 A1    8/2004 Kano et al.
(Continued)

FOREIGN PATENT DOCUMENTS

| JP | 2003-15915 A | 1/2003 |
| JP | 2007-156815 A | 6/2007 |

(Continued)

*Primary Examiner* — Charles Rones
*Assistant Examiner* — Hewy Li
(74) *Attorney, Agent, or Firm* — Mattingly & Malur, PC

(57) ABSTRACT

Multiple storage apparatuses each provide a virtual logical volume composed of multiple logical pages to a host computer. A management computer determines a target logical page to which data are migrated to achieve a volume goal performance on the basis of access path information that can identify a storage apparatus that receives an I/O request in which the virtual logical volume is specified, an actual volume response performance, the volume goal performance to be attained, a page response performance of the logical page, and storage destination information that can identify a storage apparatus in which a storage area allocated to the logical page is present, and migrates data of the logical page between storage apparatuses.

15 Claims, 24 Drawing Sheets

| Virtual logical volume ID | Front physical storage apparatus | Front port | Host computer ID | Capacity [GB] | Response performance [msec] | IOPS | Acquisition date and time | Goal responsiveness [msec] | Continuous goal non-attainment time [min] | Non-attainment permissible time [min] |
|---|---|---|---|---|---|---|---|---|---|---|
| VVOL-1 | Storage-1 | Storage-Port-1 | Host-1 | 1000 | 2.0 | 18000 | 2013/1/1 00:00:00 | 1,3 | 10 | 5 |
| VVOL-2 | Storage-1 | Storage-Port-1 | Host-1 | 500 | 1.2 | 15000 | 2013/1/1 00:00:00 | 1.5 | 0 | 10 |
| VVOL-3 | Storage-1 | Storage-Port-1 | Host-1 | 700 | 2.1 | 13000 | 2013/1/1 00:00:00 | 1.3 | 1 | 0 |
| ... | ... | ... | ... | ... | ... | ... | ... | ... | ... | ... |

(51) Int. Cl.
*G06F 13/14* (2006.01)
*G06F 12/1009* (2016.01)

(52) U.S. Cl.
CPC .......... *G06F 3/0647* (2013.01); *G06F 3/0659* (2013.01); *G06F 3/0665* (2013.01); *G06F 3/0683* (2013.01); *G06F 12/1009* (2013.01); *G06F 13/10* (2013.01); *G06F 13/14* (2013.01); *G06F 2212/1024* (2013.01); *G06F 2212/152* (2013.01); *G06F 2212/657* (2013.01)

(56) References Cited

U.S. PATENT DOCUMENTS

| | | |
|---|---|---|
| 2008/0059697 A1 | 3/2008 | Sakaki et al. |
| 2008/0313641 A1* | 12/2008 | Inoue ................ G06F 3/061 718/104 |
| 2009/0144732 A1* | 6/2009 | Tanaka ................ G06F 3/0613 718/1 |
| 2011/0060885 A1 | 3/2011 | Satoyama et al. |
| 2011/0197044 A1* | 8/2011 | Sudo ................ G06F 3/061 711/165 |
| 2011/0246740 A1* | 10/2011 | Yata ................ G06F 3/0611 711/165 |
| 2011/0252214 A1* | 10/2011 | Naganuma ............ G06F 3/0607 711/170 |
| 2012/0159112 A1 | 6/2012 | Tokusho et al. |

FOREIGN PATENT DOCUMENTS

| | | |
|---|---|---|
| JP | 2008-65561 A | 3/2008 |
| JP | 2010-79626 A | 4/2010 |
| JP | 2010-266993 A | 11/2010 |
| JP | 2011-221660 A | 11/2011 |
| WO | 2012/066671 A1 | 5/2012 |
| WO | 2012/081089 A1 | 6/2012 |
| WO | 2012/169027 A1 | 12/2012 |

* cited by examiner

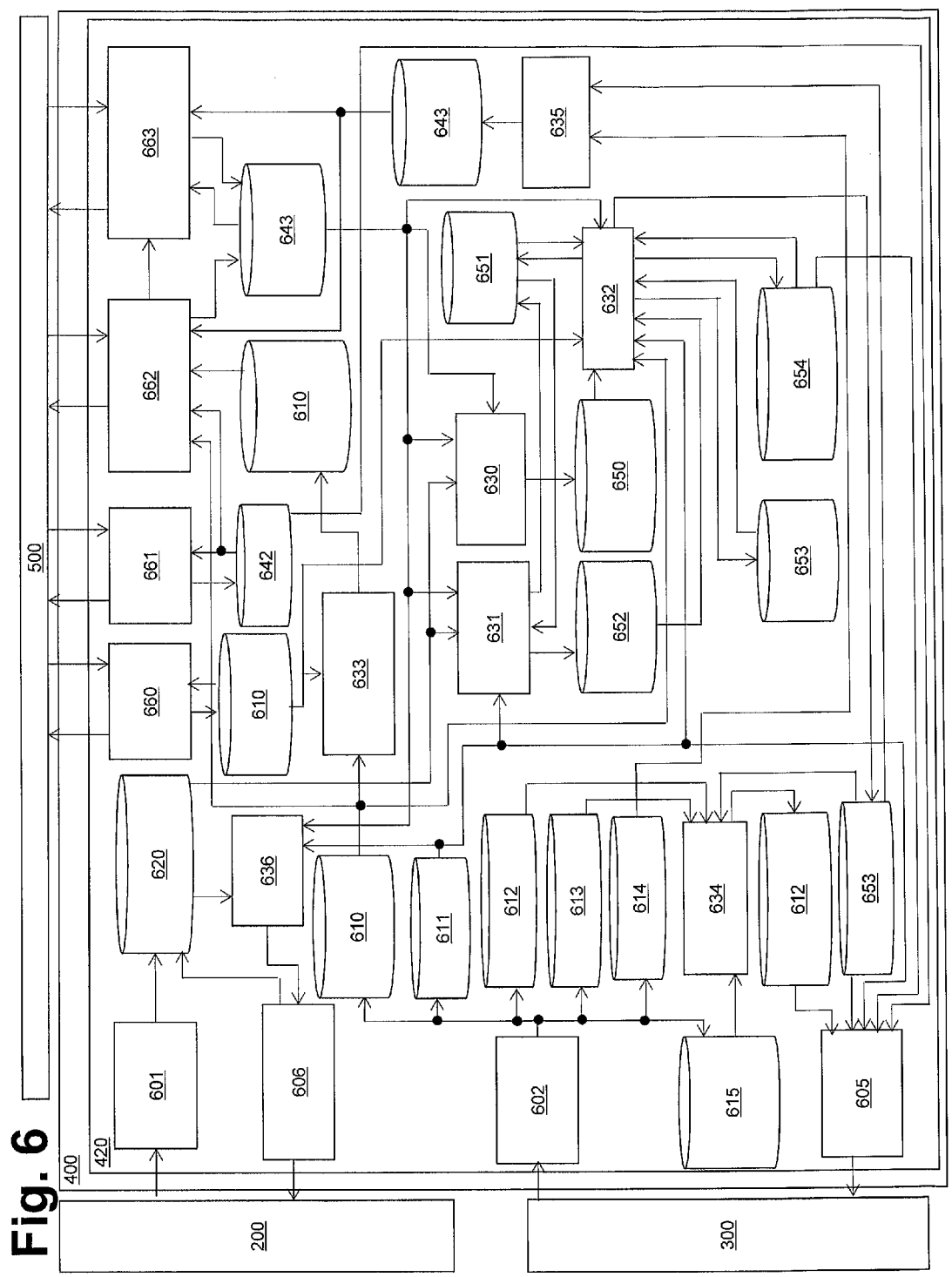

Fig. 7

| Virtual logical volume ID | Front physical storage apparatus | Front port | Host computer ID | Capacity [GB] | Response performance [msec] | IOPS | Acquisition date and time | Goal responsiveness [msec] | Continuous goal non-attainment time [min] | Non-attainment permissible time [min] |
|---|---|---|---|---|---|---|---|---|---|---|
| VVOL-1 | Storage-1 | Storage-Port-1 | Host-1 | 1000 | 2.0 | 18000 | 2013/1/1 00:00:00 | 1.3 | 10 | 5 |
| VVOL-2 | Storage-1 | Storage-Port-1 | Host-1 | 500 | 1.2 | 15000 | 2013/1/1 00:00:00 | 1.5 | 0 | 10 |
| VVOL-3 | Storage-1 | Storage-Port-1 | Host-1 | 700 | 2.1 | 13000 | 2013/1/1 00:00:00 | 1.3 | 1 | 0 |
| ... | ... | ... | ... | ... | ... | ... | ... | ... | ... | ... |

Fig. 8

| Virtual logical volume ID 620a | Host computer ID 620b | Host computer port ID 620c | Physical storage apparatus ID 620d | Physical storage apparatus port ID 620e | Access path classification 620f |
|---|---|---|---|---|---|
| VVOL-1 | Host-1 | Host-Port-1 | Storage-1 | Storage-Port-1 | true |
| VVOL-1 | Host-1 | Host-Port-2 | Storage-2 | Storage-Port-2 | false |
| VVOL-2 | Host-1 | Host-Port-3 | Storage-3 | Storage-Port-3 | false |
| ... | ... | ... | ... | ... | ... |

| Virtual logical volume ID | Front physical storage apparatus | Front port | Host computer ID | Response performance [msec] | Goal responsive-ness [msec] | Handling priority | Predicted required time [min] |
|---|---|---|---|---|---|---|---|
| 643a | 643b | 643c | 643d | 643e | 643f | 643g | 643h |
| VVOL-3 | Storage-1 | Storage-Port-1 | Host-1 | 2.1 | 1.3 | Low | 15 |
| VVOL-1 | Storage-1 | Storage-Port-1 | Host-1 | 2.0 | 1.3 | High | 12 |
| ... | ... | ... | ... | ... | ... | ... | ... |

| Pool ID | Virtual logical volume ID | Page ID | Physical storage apparatus ID | IOPS | Response performance [msec] | Transfer amount [Mbps] | Capacity [MB] |
|---|---|---|---|---|---|---|---|
| Pool-1 | VVOL-1 | Page-1 | Storage-1 | 100 | 1.00 | 0.1 | 40 |
| Pool-1 | VVOL-1 | Page-2 | Storage-2 | 500 | 1.95 | 0.3 | 40 |
| Pool-1 | VVOL-1 | Page-3 | Storage-2 | 400 | 2.05 | 0.2 | 40 |
| Pool-1 | VVOL-1 | Page-4 | Storage-3 | 380 | 2.15 | 0.25 | 40 |
| Pool-1 | VVOL-1 | Page-5 | Storage-3 | 400 | 2.05 | 0.22 | 40 |
| ... | ... | ... | ... | ... | ... | ... | ... |

Fig. 11

| Virtual logical volume ID | I/O receiving storage apparatus | I/O transfer necessity | I/O transfer destination storage apparatus | Response performance [msec] |
|---|---|---|---|---|
| VVOL-1 | Storage-1 | false | null | 1.0 |
| VVOL-1 | Storage-1 | true | Storage-2 | 2.0 |
| VVOL-1 | Storage-1 | true | Storage-3 | 2.1 |
| ... | ... | ... | ... | ... |

Fig. 12

| Pool ID 653a | Virtual logical volume ID 653b | Page ID 653c | Physical storage apparatus ID 653d | Migration destination physical storage apparatus 653e | Response performance improvement effect [msec] 653f | Migration target classification 653 / 653g |
|---|---|---|---|---|---|---|
| Pool-1 | VVOL-1 | Page-1 | Storage-1 | Storage-1 | 0.000 | true |
| Pool-1 | VVOL-1 | Page-2 | Storage-2 | Storage-1 | 0.028 | true |
| Pool-1 | VVOL-1 | Page-3 | Storage-2 | Storage-1 | 0.022 | true |
| Pool-1 | VVOL-1 | Page-4 | Storage-3 | Storage-1 | 0.023 | true |
| Pool-1 | VVOL-1 | Page-5 | Storage-3 | Storage-1 | 0.024 | true |
| ⋮ | ⋮ | ⋮ | ⋮ | ⋮ | ⋮ | ⋮ |

Fig. 14

| Physical storage apparatus ID (613a) | RAID group ID (613b) | Usage [%] (613c) |
|---|---|---|
| Storage-1 | RG-1 | 20 |
| Storage-1 | RG-2 | 60 |
| Storage-2 | RG-2 | 30 |
| Storage-3 | RG-1 | 10 |
| ... | ... | ... |

| Migration source storage (614a) | Migration destination storage (614b) | Transfer rate [Gbps] (614c) |
|---|---|---|
| Storage-1 | Storage-2 | 8.0 |
| Storage-1 | Storage-3 | 7.5 |
| Storage-2 | Storage-1 | 5.0 |
| ... | ... | ... |

Target virtual logical volume selection — 2300

List of virtual logical volumes — 2310

Filter ● On ○ Off

| Virtual logical volume | Virtual storage | Host name | Response performance [msec] | Goal responsiveness [msec] | Goal attainment status | Continuous non-attainment time [ min ] | Priority |
|---|---|---|---|---|---|---|---|
| VVOL-3 | Storage-V1 | Host1 | 2.1 | 1.3 | Unattained | 1 | Low |
| ... | ... | ... | ... | ... | ... | ... | ... |

2311 — 2312

Select all — 2350

▼ Add — 2330    ▲ Exclude — 2340    Update responsiveness — 2320

List of target virtual logical volumes

| Virtual logical volume | Virtual storage | Host name | Response performance [msec] | Goal responsiveness [msec] | Goal attainment status | Continuous non-attainment time [min] | Priority | Predicted required time [min] |
|---|---|---|---|---|---|---|---|---|
| VVOL-1 | Storage-V1 | Host1 | 2.0 | 1.3 | Unattained | 10 | High | 12 |
| ... | ... | ... | ... | ... | ... | ... | ... | ... |

2321 — 2322 — 2391 — 2380

Enter — 2360    Manually specify handling order — 2370    Display time required for handling — 2390    Cancel

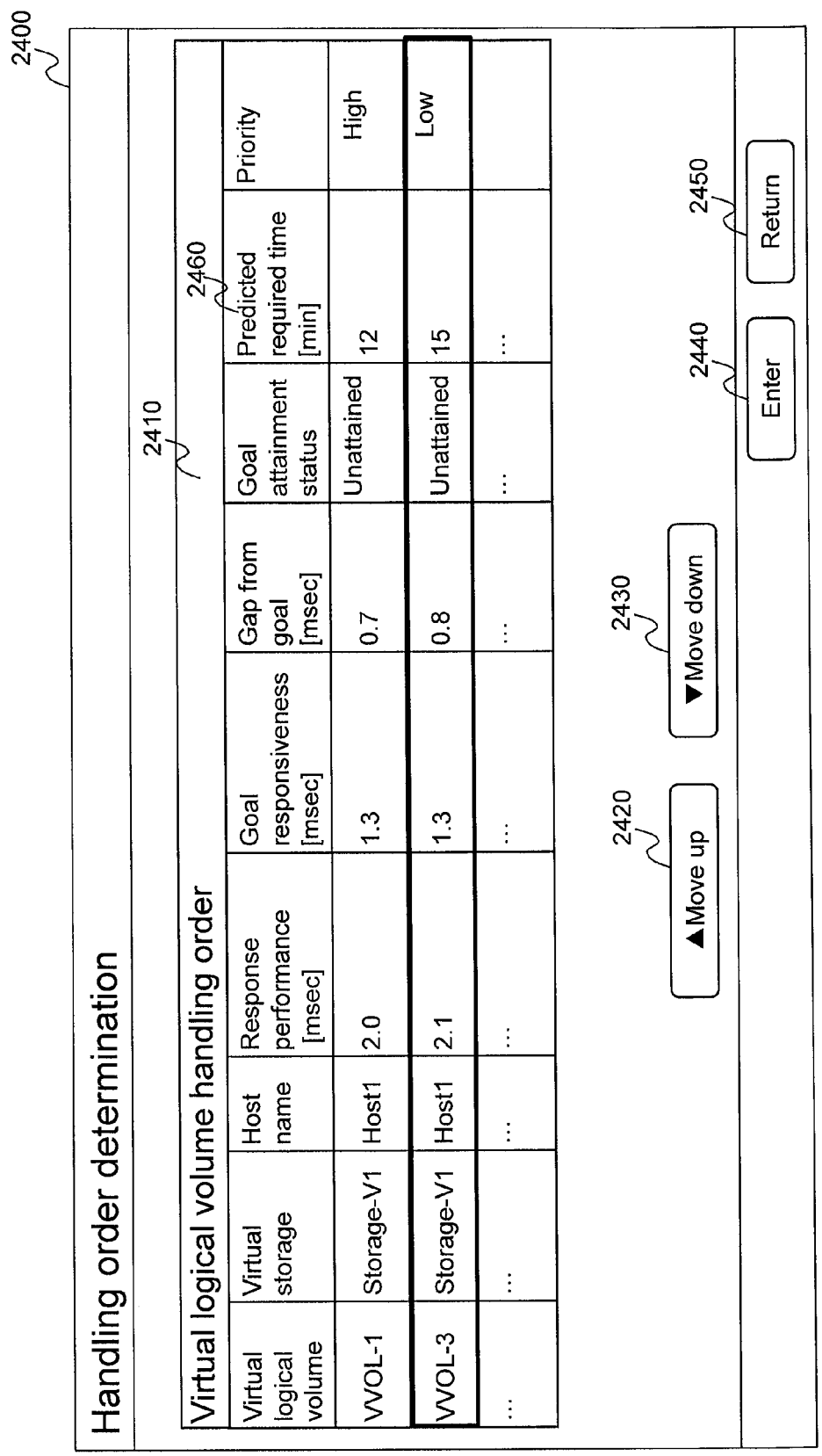

Fig. 25

Goal responsiveness editing screen

Configuration target virtual logical volume — 2510

| Virtual logical volume | Virtual storage | Host name | Response performance [msec] | Goal responsiveness | Non-attainment permissible time |
|---|---|---|---|---|---|
| VVOL-3 | Storage-V1 | Host1 | 2.1 | Not configured | Not configured |
| ... | ... | ... | ... | ... | ... |

2530

Goal responsiveness: High — Medium ▲ — Low   2520

1.3 msec   2560

Non-attainment permissible time: 0.0 min   2540

[Determine] [Cancel]   2550

METHOD FOR SELECTING A PAGE FOR MIGRATION BASED ON ACCESS PATH INFORMATION AND RESPONSE PERFORMANCE INFORMATION

TECHNICAL FIELD

The present invention relates to a technology for managing virtual a logical volume to which a physical page are allocated from a pool that is based on multiple storage apparatuses and that is a storage area constituted by multiple physical pages.

BACKGROUND ART

For efficient use of storage areas in storage systems, there is known a technology of dynamically allocating real storage areas needed for storing data in units called real pages to virtual logical volumes (logical volumes that are virtual) when a write request occurs (refer to PTL 1, for example).

Furthermore, there is known a technology of determining whether or not an I/O request is a request for a storage area of a storage apparatus in receipt of the I/O request and, if the I/O request is a request directed to another storage apparatus, transferring the I/O request to the storage apparatus (refer to PTL 2, for example).

In addition, there is known a technology of embedding a storage area of a pool present in a storage apparatus coupled to another storage apparatus into a storage area of a pool constructed in the latter storage apparatus to allow integration of pools present in multiple storage apparatuses (refer to PTL 3, for example).

According to these technologies, a storages area of one virtual logical volume can be distributed to multiple storage apparatuses, and the storage area of the virtual logical volume can be accessed from any storage apparatus.

Furthermore, there is known a technology of determining whether or not usage of storage apparatuses constituting a tiered pool is optimum as a whole (refer to PTL 4, for example). According to this technology, a migration candidate virtual logical volume and a migration destination pool that are closer to optimum as a whole can be displayed or the virtual logical volume can be migrated.

Furthermore, there is known a technology of efficiently using virtual logical volumes generated on the basis of a tiered pool by different types of applications (refer to PTL 5, for example). According to this technology, the virtual logical volumes can be efficiently used according to the required performance of applications.

CITATION LIST

Patent Literature

[PTL 1] JP 2003-15915
[PTL 2] JP 2008-65561
[PTL 3] US 2011/0060885
[PTL 4] JP 2011-221660
[PTL 5] WO 2012/081089

SUMMARY OF INVENTION

Technical Problem

A real storage area of a virtual logical volume based on a pool constituted by storage areas of multiple storage apparatuses may be distributed to storage areas of multiple storage apparatuses. In a case where the storages area of the virtual logical volume is distributed to storage areas of multiple storage apparatuses and where an I/O request for the virtual logical volume occurs, if a storage apparatus in receipt of the I/O request from a host computer does not have the storage area of the virtual logical volume that is the target of the I/O request, the I/O request needs to be transferred from the storage apparatus to another storage apparatus, and such transfer of I/O requests to other storage apparatuses may be frequent. When I/O requests are frequently transferred in this manner, the response performance of the virtual logical volume is lowered.

Solution to Problem

A storage system includes multiple storage apparatuses and a management configured to manage the storage apparatuses. The multiple storage apparatuses are configured to provide a virtual logical volume composed of multiple logical pages to a host computer, receive an I/O request from the host computer, allocate a physical page to a logical page identified on the basis of I/O request when the I/O request is a write request, and write target data of the write request in the allocated physical page. The management computer is configured to determine a logical page that is a target of data migration to attain a volume goal performance on the basis of access path information that can identify a storage apparatus that receives an I/O request in which the virtual logical volume is specified by the host computer, an actual volume response performance of a processing target virtual logical volume, the volume goal performance to be attained, a page response performance of a logical page in the virtual logical volume, and storage destination information that can identify a storage apparatus in which a physical page allocated to the logical page is present, and migrate data in the physical page allocated to the target logical page from the storage apparatus having the physical page allocated to the target logical page to a physical page of another storage apparatus.

Advantageous Effects of Invention

The degradation in response performance for a virtual logical volume can be alleviated.

BRIEF DESCRIPTION OF DRAWINGS

FIG. 6 is a configuration diagram of the inside of a memory of a management computer according to an embodiment.
FIG. 7 is a configuration diagram of a virtual logical volume table according to an embodiment.
FIG. 8 is a configuration diagram of a path management table according to an embodiment.
FIG. 9 is a configuration diagram of a target virtual logical volume table according to an embodiment.

FIG. 10 is a configuration diagram of a page table according to an embodiment.

FIG. 11 is a configuration diagram of a path performance information table according to an embodiment.

FIG. 12 is a configuration diagram of a page migration management table according to an embodiment.

FIG. 14 is a configuration diagram of an RAID group table according to an embodiment.

FIG. 15 is a configuration diagram of an apparatus-to-apparatus transfer rate table according to an embodiment.

FIG. 23 is a configuration diagram of a virtual logical volume selection screen according to an embodiment.

FIG. 24 is a configuration diagram of a virtual logical volume handling order determination screen according to an embodiment.

FIG. 25 is a configuration diagram of a goal response performance editing screen according to an embodiment.

DESCRIPTION OF EMBODIMENTS

Embodiments will hereinafter be described. Note that the embodiments described below do not limit the invention according to the claims, and not all of elements and combinations thereof described in the embodiments are necessarily essential for solutions of the invention.

Although various information data may be expressed as "aaa table" in the following description, the information data may be expressed in data structures other than tables. An "aaa table" can be replaced with "aaa information" to indicate that the information data are not dependent on the data structures.

Furthermore, although a process may be described with a "program" being a subject thereof in the following description, a subject of a process may be a processor (such as a CPU: Central Processing Unit) included in a controller because a program, when executed by the processor, performs a predetermined process by using storage resources (such as a memory) and/or communication interface apparatuses (such as a SAN port or a LAN port) where appropriate. A process described to be performed by a program may be a process to be performed by a controller. Furthermore, a controller may be a processor itself or may contain a hardware circuit that performs part or the whole of a process to be performed by a processor instead of or in addition to the processor. A computer program may be installed on a storage control apparatus from a program source. The program source may be a program distribution server or a computer-readable storage medium.

Figure 1:
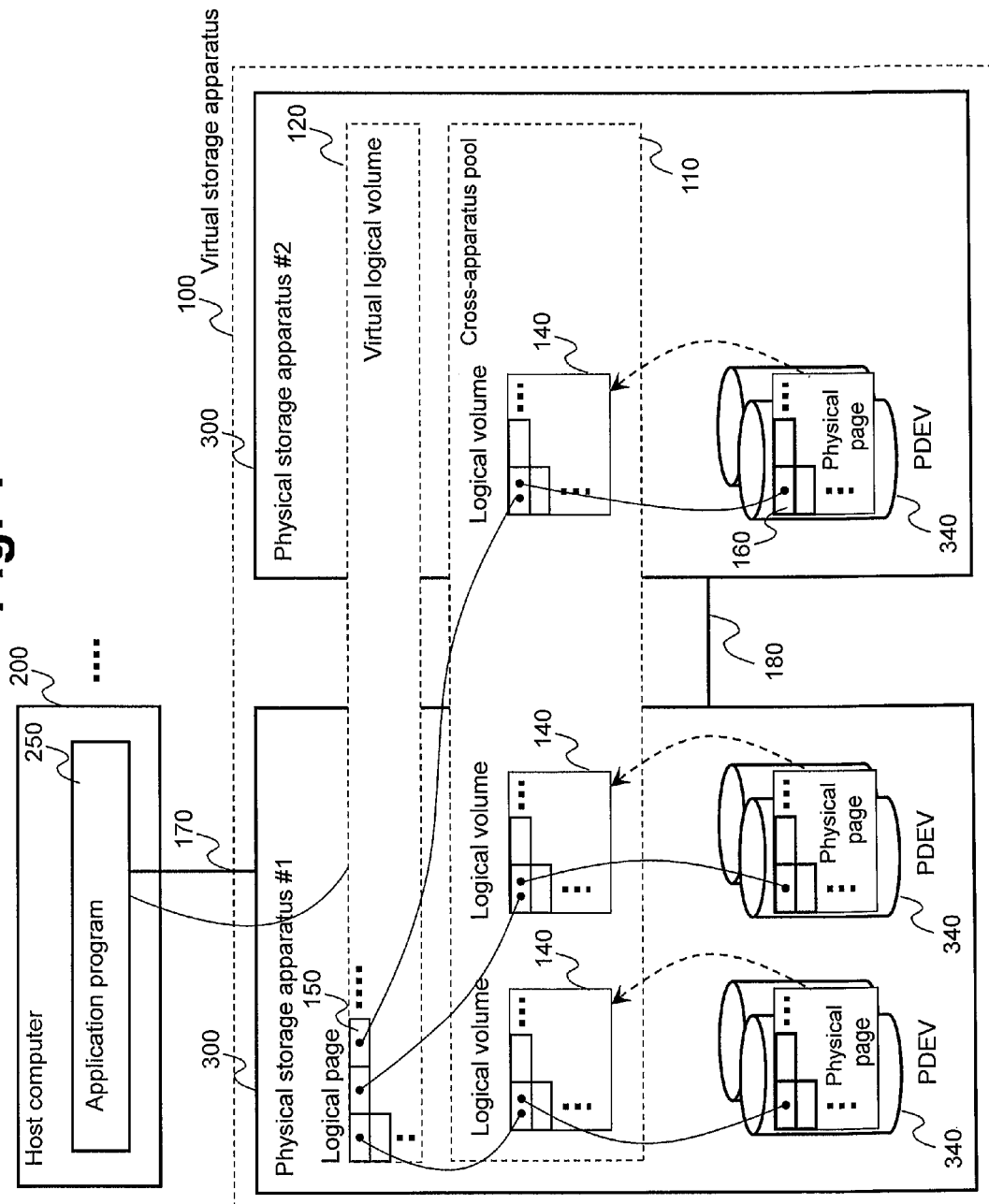
FIG. 1 is a diagram illustrating an outline of a storage system according to an embodiment.

FIG. 1 is a diagram illustrating an outline of a storage system according to an embodiment.

Figure 2:
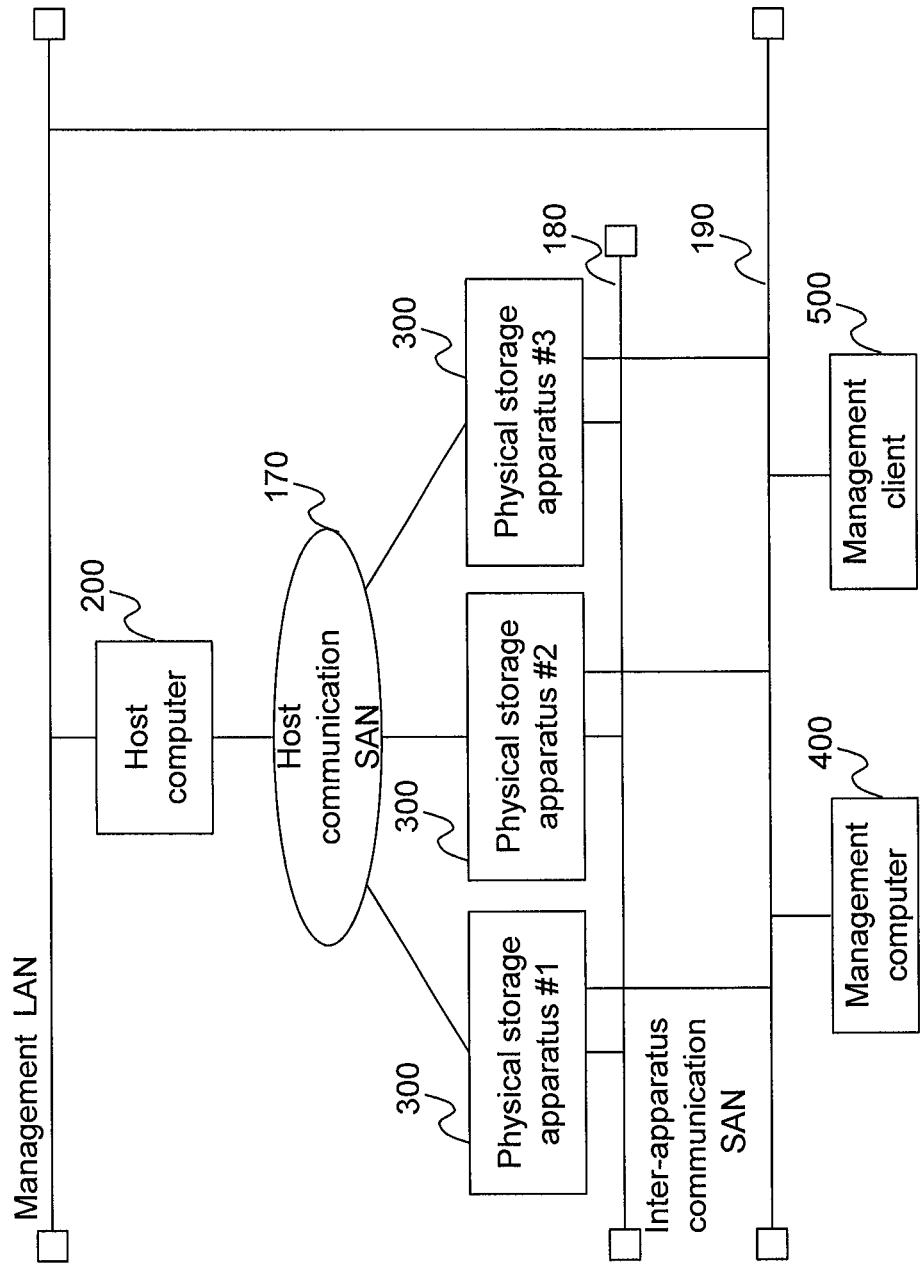
FIG. 2 is a hardware configuration diagram of a storage system according to an embodiment.

The storage system includes a host computer 200, multiple physical storage apparatuses 300, and a management computer 400 (see FIG. 2). The host computer 200 and the physical storage apparatuses 300 are coupled via a communication network 170. Furthermore, the physical storage apparatuses 300 are coupled via a communication network 180.

The physical storage apparatus 300 includes one or more physical storage devices (PDEVs) 340. In the storage system according to the present embodiment, one virtual storage apparatus 100 is formed on the basis of a plurality of physical storage apparatuses 300. Specifically, a pool 110 that is a storage area constituted by multiple physical pages 160 is formed on the basis of storage areas of the PDEVs 340 of the physical storage apparatuses 300. Since the pool 110 spans a plurality of physical storage apparatuses 300, the pool 110 is also referred to as a "cross-apparatus pool 110". The cross-apparatus pool 110 is constituted by a plurality of logical volumes 140 included in a plurality of physical storage apparatuses 300. Each logical volume 140 is divided into two or more physical pages 160, and the cross-apparatus pool 110 is thus constituted by a plurality of physical pages 160. A logical volume 140 may be based on one or more PDEVs 340 of the physical storage apparatuses 300 or may be a virtual logical volume obtained by virtualizing a storage resource (logical volume, for example) of an external storage apparatus (not illustrated) coupled to a physical storage apparatus 300 according to a storage virtualization technology.

The virtual storage apparatus 100 includes a virtual logical volume 120 used by an application program 250 of the host computer 200 and constituted by multiple logical pages 150. The virtual logical volume 120 may be each of multiple virtual logical volumes which are included in the respective physical storage apparatuses 300 and to which the same volume ID (such as a LUN (Logical Unit Number)) is allotted, or may be a set of multiple virtual logical volumes included by the respective physical storage apparatuses 300. The pool 110 is associated with the virtual logical volume 120, and physical pages are allocated to the virtual logical volume 120 from the associated pool 110. Thus, if there are multiple virtual logical volumes 120 and multiple pools 110, for example, physical pages are allocated to one virtual logical volume 120 from the pool 110 associated with the virtual logical volume 120 but no physical pages may be allocated from pools 110 that are not associated with the virtual logical volume 120.

When any of the physical storage apparatuses 300 writes data onto a logical page 150 of a virtual logical volume 120, a physical page 160 is allocated to the write destination logical page 150 from the cross-apparatus pool 110, and the write target data are stored on the allocated physical page 160.

With such a configuration, the data on multiple logical pages 150 in the virtual logical volume 120 become in a state distributed to and stored in different physical storage apparatuses 300. Note that pieces of storage area constituting the pool 110 are referred to as "physical pages" and pieces of storage area constituting the virtual logical volume 120 are referred to as "logical pages" for convenience in the description above, but both are storage areas that can be specified using logical addresses such as an LBA (Logical Block Address).

The storage system according to the present embodiment selects a logical page to which a physical page on which data to be migrated between physical storages apparatuses 300 are stored is allocated from multiple logical pages 150 of the virtual logical volume 120, and migrates the data in the physical page allocated to the logical page to another physical storage apparatus 300 to improve the response performance of the virtual logical volume 120. In the following description, migration of data allocated to a logical page 150 from a migration source physical page in a migration source physical storage apparatus to a migration destination physical page in a migration destination physical storage apparatus will be referred to as "migration of a page", and a logical page to which a physical page on which data migrated resulting from "migration of a page" is stored is allocated will be referred to as a "migration target logical page". In migration of a page, either of the following may be performed:

data migrate from a migration source physical page to a migration destination physical page, and the migration destination physical page is allocated to the migration target logical page in place of the migration source physical page; and data migrate from a migration source physical page to a migration destination physical page, and identification information (such as a page number) of the migration destination physical page changes to identification information of the migration source physical page. As a result, the association between the identification information (such as a page number) of the migration target logical page and the identification information of the physical page does not change.

FIG. 2 is a hardware configuration diagram of the storage system according to an embodiment.

The storage system includes one or more host computers 200, multiple physical storage apparatuses 300, one or more management computers 400, and one or more management clients 500. The host computer 200 and the physical storage apparatuses 300 are coupled via a communication network 170 such as a SAN (Storage Area Network) for host communication. In addition, the physical storage apparatuses 300 are coupled via a communication network 180 such as a SAN for inter-apparatus communication. Furthermore, the host computer 200, the physical storage apparatuses 300, the management computer 400, and the management client 500 are coupled via a communication network 190 such as a LAN (Local Area Network) for management.

The management client 500 is a PC (Personal Computer), for example, and used for executing various operations on the management computer 400 by an administrator of the storage system. Although an example in which the physical storage apparatuses 300 and the management computer 400 are separate apparatuses is illustrated in the storage system illustrated in FIG. 2, the management computer 400 and any one of the physical storage apparatuses 300 may be implemented by one computer.

Figure 3:
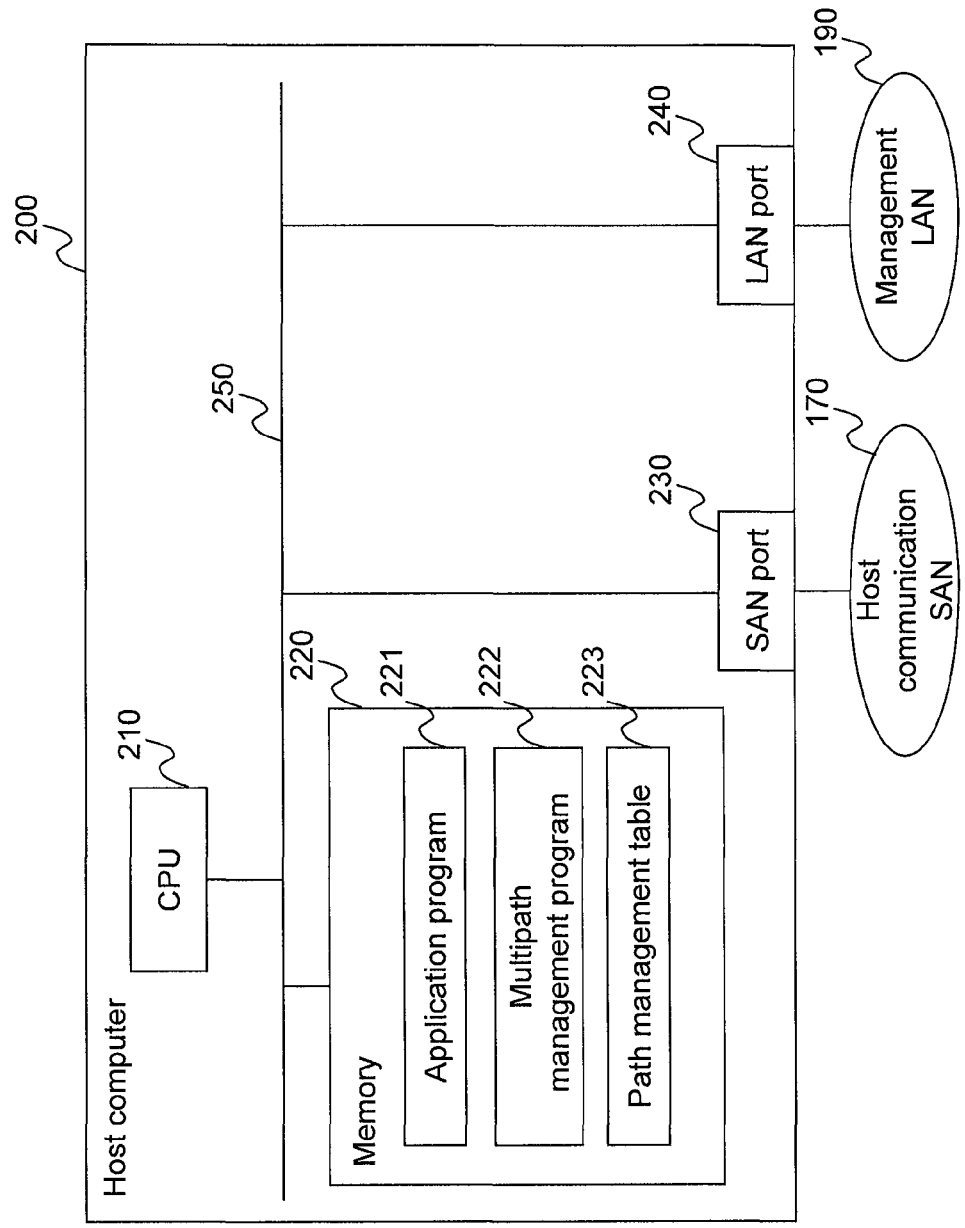
FIG. 3 is a configuration diagram of a host computer according to an embodiment.

FIG. 3 is a configuration diagram of the host computer according to an embodiment.

The host computer 200 includes a CPU 210, a memory 220, a SAN port 230, a LAN port 240, and a bus 250. The CPU 210, the memory 220, the SAN port 230, and the LAN port 240 are coupled in a manner that can communicate with one another via the bus 250.

The SAN port 230 is a communication interface apparatus for communication with the physical storage apparatuses 300 via the communication network 170. The LAN port 240 is a communication interface apparatus for communication with the management computer 400, etc., via the communication network 190. The CPU 210 executes various programs stored in the memory 220 to perform various processes.

The memory 220 stores various programs and various information. The memory 220 stores an application program 221, a multipath management program 222, and a path management table 223, for example.

The application program 221 is a program for performing input/output of data. In the present embodiment, an I/O destination is the virtual logical volume 120. The multipath management program 222 is a program for managing which of multiple paths to multiple physical storage apparatuses 300 coupled to the host computer 200 should be used. The path management table 223 stores information on paths through which the host computer 200 is coupled to the physical storage apparatuses 300, and information indicating which path to use (which path is active). The path management table 223 stores identification information (port numbers) of ports of the physical storage apparatuses 300, identification information (such as a WWN: World Wide Name) of the host computer 200, and information indicating whether or not the paths are active in association with one another, for example.

Figure 4:
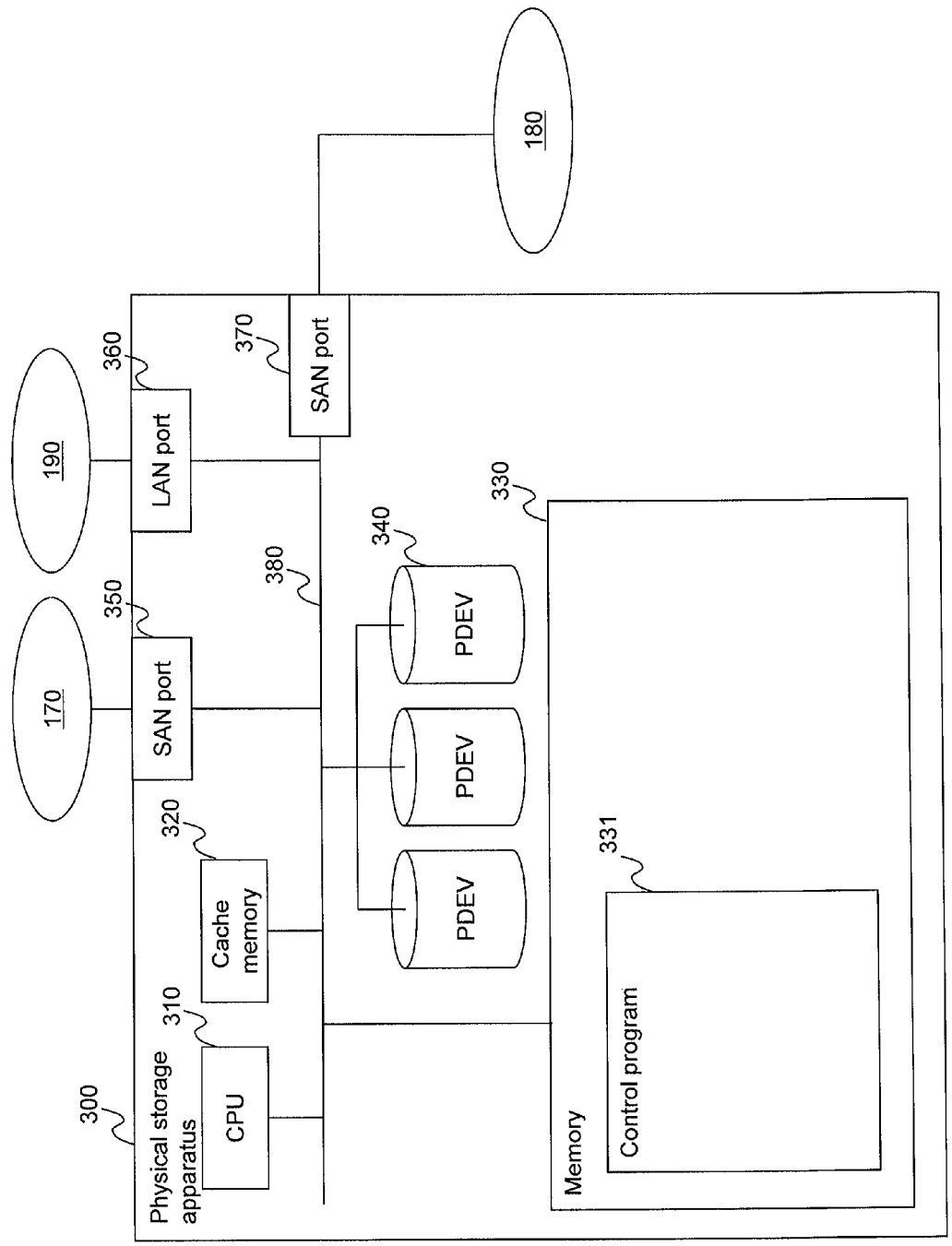
FIG. 4 is a configuration diagram of a physical storage apparatus according to an embodiment.

FIG. 4 is a configuration diagram of a physical storage apparatus according to an embodiment.

The physical storage apparatus 300 includes a CPU 310, a cache memory 320, a memory 330, one or more PDEVs 340, a SAN port 350, a LAN port 360, a SAN port 370, and a bus 380. The CPU 310, the cache memory 320, the memory 330, the SAN port 350, the LAN port 360, and the SAN port 370 are coupled in a manner that can communicate with one another via the 380.

The SAN port 350 is a communication interface apparatus for communication with the host computer 200 via the communication network 170. The LAN port 360 is a communication interface apparatus for communication with the management computer 400, etc., via the communication network 190. The SAN port 370 is a communication interface apparatus for communication with the physical storage apparatus 300 via the communication network 180. The cache memory 320 temporarily stores data to be written into the PDEVs 340 or data read from the PDEVs 340. The PDEVs 340 are nonvolatile storage media such as magnetic disks, flash memory, or other semiconductor memories. In the present embodiment, multiple PDEVs 340 constitute a group (RAID group) in which data are stored at a predetermined RAID level according to the RAID (Redundant ARRAY of Independent Disks), for example.

The CPU 310 executes various programs stored in the memory 330 to perform various processes. The memory 330 stores various programs and various information. The memory 330 stores a control program 331, for example. The control program 331 is a program for performing various processes in accordance with I/O requests. In the present embodiment, when an I/O request for data stored in a PDEV 340 of the same physical storage apparatus 300 is received, the control program 331 performs an I/O process on the PDEV 340 of the same physical storage apparatus 300, whereas when an I/O request for a PDEV 340 of another physical storage apparatus 300 is received, the control program 331 transmits the I/O request to the physical storage apparatus 300.

Figure 5:
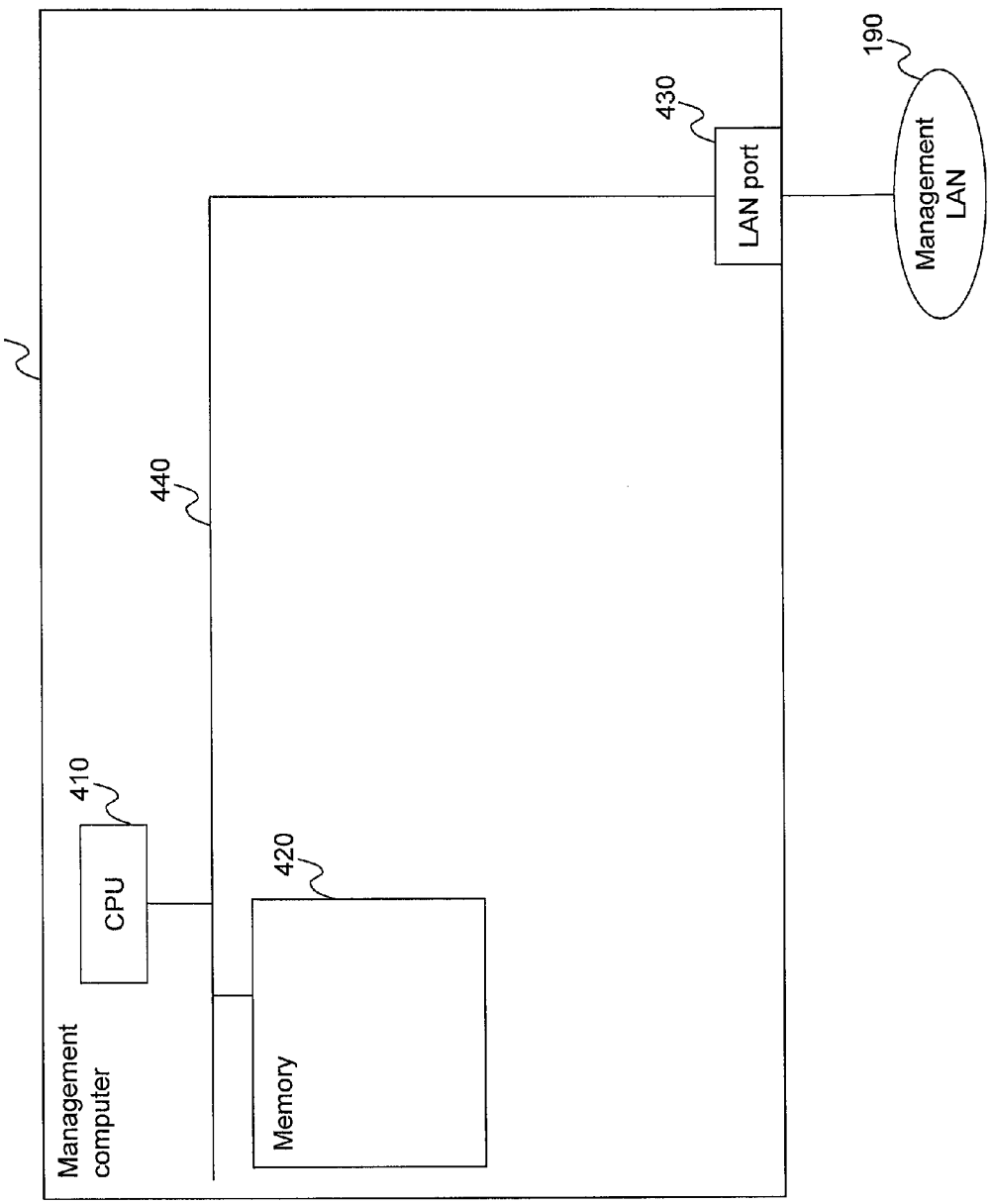
FIG. 5 is a configuration diagram of a management computer according to an embodiment.

FIG. 5 is a configuration diagram of the management computer according to an embodiment.

The management computer 400 includes a CPU 410 that is an example of a control device, a memory 420 that is an example of a storage device, a LAN port 430, and a bus 440.

The CPU 410, the memory 420, and the LAN port 430 are coupled in a manner that can communicate with one another via the bus 440.

The LAN port 430 is a communication interface apparatus for communication with the host computer 200, the physical storage apparatuses 300, and the management client 500 via the communication network 190. The CPU 410 executes various programs stored in the memory 420 to perform various processes.

The memory 420 stores various programs and various information. The programs and the information stored in the memory 420 will be described later.

FIG. 6 is a configuration diagram of the inside of the memory of the management computer according to an embodiment. Although the numbers of some tables illustrated in FIG. 6 are more than one, these are illustrated for convenience and do not necessarily mean that the numbers of tables are more than one.

The memory 420 of the management computer 400 stores a virtual logical volume table 610, a page table 611, a pool volume table 612, an RAID group table 613, an apparatus-to-apparatus transfer rate table 614, an RAID group threshold table 615, a path management table 620, a handling priority table 642, a target virtual logical volume table 643, a migration destination storage apparatus table 650, a narrowed-down page table 651, a path performance information table 652, a page migration management table 653, and a sorted page migration management table 643.

The RAID group threshold table 615 stores thresholds of the usages of RAID groups. Specifically, the RAID group threshold table 615 stores identification information (a physical storage apparatus ID) of a physical storage apparatus 300 and the threshold of the usage of an RAID group in association with each other. For example, the RAID group threshold table 615 stores that the threshold of the usage of the RAID group of a physical storage apparatus 300 "Storage-1" is 50%.

The handling priority table 642 stores priority in handling a virtual logical volume to improve performance. Specifically, the handling priority table 642 stores identification information (a virtual logical volume ID) of a virtual logical volume, and the priority on the virtual logical volume. The migration destination storage apparatus table 650 stores information identifying a physical storage apparatus (migration destination physical storage apparatus) that is a migration destination to which data on a migration target logical page of a virtual logical volume are to be migrated. Specifically, the migration destination storage apparatus table 650 stores the virtual logical volume ID, and identification information (a physical storage apparatus ID) of the migration destination physical storage apparatus. The narrowed-down page table 651 stores information on a logical page in a virtual logical volume that is a target of handling for improving performance out of information in the page table 611. The sorted page migration management table 654 is a table in which entries in the page migration management table 653 are sorted in descending order of the response performance improvement effect. The tables other than those described above will be described later with reference to the drawings.

The memory 420 also stores, as program modules, a host computer information collection unit 601, a storage apparatus information collection unit 602, a page migration control unit 605, a port change control unit 606, a migration destination storage apparatus selection unit 630, a path response performance calculation unit 631, a page selection unit 632, a goal non-attainment virtual logical volume search unit 633, an exception target pool volume search unit 634, a page migration time prediction unit 635, an access path search unit 636, a goal response performance configuration unit 660, a handling priority configuration unit 661, a virtual logical volume selection unit 662, and a virtual logical volume handling order sequencing unit 663.

The host computer information collection unit 601 is activated at predetermined timing (such as at regular timing according to a scheduling configuration) or in response to a request from the management client 500 or other program modules, collects various information necessary for the path management table 620 from the host computer 200, and creates the path management table 620.

The storage apparatus information collection unit 602 is activated at predetermined timing (such as at regular timing according to a scheduling configuration) or in response to a request from the management client 500 or other program modules, acquires information necessary for the virtual logical volume table 610, the page table 611, the RAID group table 613, and the apparatus-to-apparatus transfer rate table 614 from the respective physical storage apparatuses 300, and creates these tables. Note that part of information in the tables is not acquired from the respective physical storage apparatuses 300.

The goal non-attainment virtual logical volume search unit 633 is activated at predetermined timing (such as at regular timing according to a scheduling configuration) or in response to a request from the management client 500 or other program modules (such as the virtual logical volume selection unit 662), searches for a virtual logical volume that has not reached the response performance (goal response performance) that is a goal on the basis of information in the virtual logical volume table 610, and configures information on goal non-attainment of the virtual logical volume in the virtual logical volume table 610. Note that handling operation of program modules other than those described above will be described later.

FIG. 7 is a configuration diagram of the virtual logical volume table according to an embodiment.

The virtual logical volume table 610 is a table storing volume response performance information and volume goal performance information, and stores, for each virtual logical volume, entries including fields of a virtual logical volume ID 610a, a front physical storage apparatus 610b, a front port 610c, a host computer ID 610d, a capacity 610e, a response performance 610f, an IOPS 610g, acquisition date and time 610h, a goal response performance 610i, a continuous goal non-attainment time 610j, and a non-attainment permissible time 610k.

The virtual logical volume ID 610a stores identification information (a virtual logical volume ID) of the virtual logical volume. The front physical storage apparatus 610b stores identification information (a physical storage ID) of the physical storage apparatus 300 that is a window (a front) of access to the virtual logical volume. The front port 610c stores identification information (a port ID) of a port that is a front. The host computer ID 610d stores identification information (a host computer ID) of a host computer 200 that uses the virtual logical volume, that is, that accesses the virtual logical volume. The capacity 610e stores the capacity of the virtual logical volume. The response performance 610f stores the response performance of the virtual logical volume. Note that the response performance refers to time from when an I/O request is transmitted till a response to the I/O request is returned, for example. The IOPS 610g stores an IOPS (Input Output Per Second) to/from the virtual logical volume. The IOPS is the number of I/O requests per second, but another type of I/O frequency corresponding to the number of I/O requests per predetermined time may alternatively be employed. Another type of access status such as final access date and time may be used instead of or in addition to the I/O frequency. The acquisition date and time 610h stores the date and time on which the response performance in the response performance 610f and the IOPS in the IOPS 610g are acquired. The goal response performance 610i stores the response performance (goal response performance) that is a goal for the virtual logical volume. The continuous goal non-attainment time 610j stores time (continuous goal non-attainment time) during which the goal response performance is continuously unattained. The non-attainment permissible time 610k stores time during which non-attainment of the goal response performance is permitted.

FIG. 8 is a configuration diagram of the path management table according to an embodiment.

The path management table 620 is a table for managing access path information, and stores, for each of paths between the host computer 200 and the physical storage apparatuses 300, entries including fields of a virtual logical volume ID 620a, a host computer ID 620b, a host computer port ID 620c, a physical storage apparatus ID 620d, a physical storage apparatus port ID 620e, and an access path classification 620f.

The virtual logical volume ID 620a stores a virtual logical volume ID of a virtual logical volume that is a target of a path associated with an entry. The host computer ID 620b stores a host computer ID of the host computer 200 that performs access using the path. The host computer port ID 620c stores a port ID of a port (a SAN port 230) of the host computer 200 used on the path. The physical storage apparatus ID 620d stores a physical storage apparatus ID of the physical storage apparatus 300 to which the path is coupled. The physical storage apparatus port ID 620e stores a port ID of a port (a SAN port 350) of the physical storage apparatus 300 to which the path is coupled. The access path classification 620f stores information indicating whether or not the path corresponds to a path (access path) used for accessing the virtual logical volume associated with the virtual logical volume ID in the virtual logical volume ID 620a. In the present embodiment, when the path associated with an entry is an access path to the virtual logical volume associated with the virtual logical volume ID in the virtual logical volume ID 620a, "true" is set in the access path classification 620f, whereas if the path is not the access path, "false" is set in the access path classification 620f.

FIG. 9 is a configuration diagram of the target virtual logical volume table according to an embodiment.

The target virtual logical volume table 643 stores, for each virtual logical volume (target virtual logical volume) that is a target of performance improvement, entries including fields of a virtual logical volume ID 643a, a front physical storage apparatus 643b, a front port 643c, a host computer ID 643d, a response performance 643e, a goal response performance 643f, a handling priority 643g, and a predicted required time 643h.

The virtual logical volume ID 643a stores a virtual logical volume ID of the target virtual logical volume. The front physical storage apparatus 643b stores a physical storage apparatus ID of the physical storage apparatus 300 that is a window (a front) of access to the target virtual logical volume. The front port 643c stores identification information of a port (a SAN port 350) that is a front. The host computer ID 643d stores a host computer ID of a host computer 200 that accesses the target virtual logical volume. The response performance 643e stores the response performance of the target virtual logical volume. The goal response performance 643f stores the response performance (goal response performance) that is a goal for the target virtual logical volume. The handling priority 643g stores the priority (handling priority) in execution of handing for performance improvement of the target virtual logical volume associated with an entry. The handling priority configured in the handling priority 643g may include three levels of "high", "medium", and "low", may include more levels, or may include any number of levels, for example. Handling for performance improvement of the target virtual logical volume with higher handing priority will preferentially be performed. The predicted required time 643h stores time (predicted required time) predicted to be required for improving the response performance of the target virtual logical volume to the goal response performance, that is, time required to complete handling. Note that "high handling priority" may mean that the handling priority is the highest or may mean that the handling priority is relatively high (specifically, that handling priority is within top X % (X>0) or that the handling priority is "high" (and "medium"), for example). Conversely, "low handling priority" may mean that the handling priority is the lowest, or may mean that the handling priority is relatively low (specifically, that the handling priority is within bottom Y % (Y is equal to or smaller than (100−X); Y>0) of multiple virtual logical volumes or that the handling priority is "low" (and "medium"), for example).

FIG. 10 is a configuration diagram of the page table according to an embodiment.

The page table 611 is a table storing storage destination information, and stores, for each logical page of a virtual logical volume, entries including fields of a pool ID 611a, a virtual logical volume ID 611b, a page ID 611c, a physical storage apparatus ID 611d, an IOPS 611e, a response performance 611f, a transfer amount 611g, and a capacity 611h.

The pool ID 611a stores identification information (a pool ID) of a pool in which the virtual logical volume is managed. The virtual logical volume ID 611b stores a virtual logical volume ID. The page ID 611c stores identification information (a page ID) of a logical page in the virtual logical volume. The physical storage apparatus ID 611d stores a physical storage apparatus ID of the physical storage apparatus 300 to which a physical area (a physical page) allocated to the logical page belongs. The IOPS 611e stores the IOPS for the logical page. The response performance 611f stores the response performance for the logical page. The transfer amount 611g stores the data transfer amount for the logical page. The capacity 611h stores the capacity of the logical page.

FIG. 11 is a configuration diagram of the path performance information table according to an embodiment.

The path performance information table 652 is a table for managing response performance information for each path and for managing the response performance for each of multiple paths that can be a path in accessing the virtual logical volume, and stores entries including fields of a virtual logical volume ID 652a, I/O receiving storage apparatus 652b, an I/O transfer necessity 652c, an I/O transfer destination storage apparatus 652d, and a response performance 652e.

The virtual logical volume ID 652a stores a virtual logical volume ID. The I/O receiving storage apparatus 652b stores a physical storage apparatus ID of the physical storage apparatus 300 that is a window for the virtual logical volume associated with the virtual logical volume ID of this entry. The I/O transfer necessity 652c stores information indicating whether or not an I/O request needs to be transferred from the physical storage apparatus 300 that is the window to another physical storage apparatus 300. If the path requires transfer to another physical storage apparatus 300, "true" is stored in the I/O transfer necessity 652c, whereas if the path does not require transfer to another physical storage apparatus 300, "false" is stored in the I/O transfer necessity 652c. The I/O transfer destination storage apparatus 652d stores a physical storage apparatus ID of a transfer destination physical storage apparatus 300 to which the I/O request is to be transferred. The response performance 652e stores the response performance when the path associated with the entry is used.

According to the path performance information table 652 illustrated in FIG. 11, the window for a virtual logical volume "VVOL-1" is a physical storage apparatus 300 "Storage-1", the response performance is 1.0 msec when the I/O request is not transferred, the response performance is 2.0 msec when the I/O request is transferred to a physical storage apparatus 300 "Storage-2", and the response performance is 2.1 msec when the I/O request is transferred to a physical storage apparatus 300 "Storage-3", which shows that the paths requiring transfer of I/O request have low response performance.

FIG. 12 is a configuration diagram of the page migration management table according to an embodiment.

The page migration management table 653 is a table for managing information on the response performance improvement effect when data on a logical page of a virtual logical volume is migrated, and stores, for each logical page, entries including fields of a pool ID 653a, a virtual logical volume ID 653b, a page ID 653c, a physical storage apparatus ID 653d, a migration destination physical storage apparatus 653e, a response performance improvement effect 653f, and a migration target classification 653g.

The pool ID 653a stores a pool ID of the pool in which the virtual logical volume containing the logical page associated with an entry is stored. The virtual logical volume ID 653b stores a virtual logical volume ID of the virtual logical volume containing the logical page. The page ID 653c stores a page ID of the logical page. The physical storage apparatus ID 653d stores a physical storage apparatus ID of the physical storage apparatus 300 having a physical area in which data on the logical page are stored. The migration destination physical storage apparatus 653e stores a physical storage apparatus ID of a migration destination physical storage apparatus 300 having a physical area that is the migration destination of the data on the logical page. The response performance improvement effect 653f stores the response performance improvement effect that can be achieved when the data on the logical page associated with the entry are migrated to the physical area in the migration destination physical storage apparatus 300. The response performance improvement effect 653f stores time by which the response performance is shortened, for example, as the response performance improvement effect. The migration target classification 653g stores information indicating whether or not the logical page associated with the entry corresponds to a migration target logical page.

Figure 13:
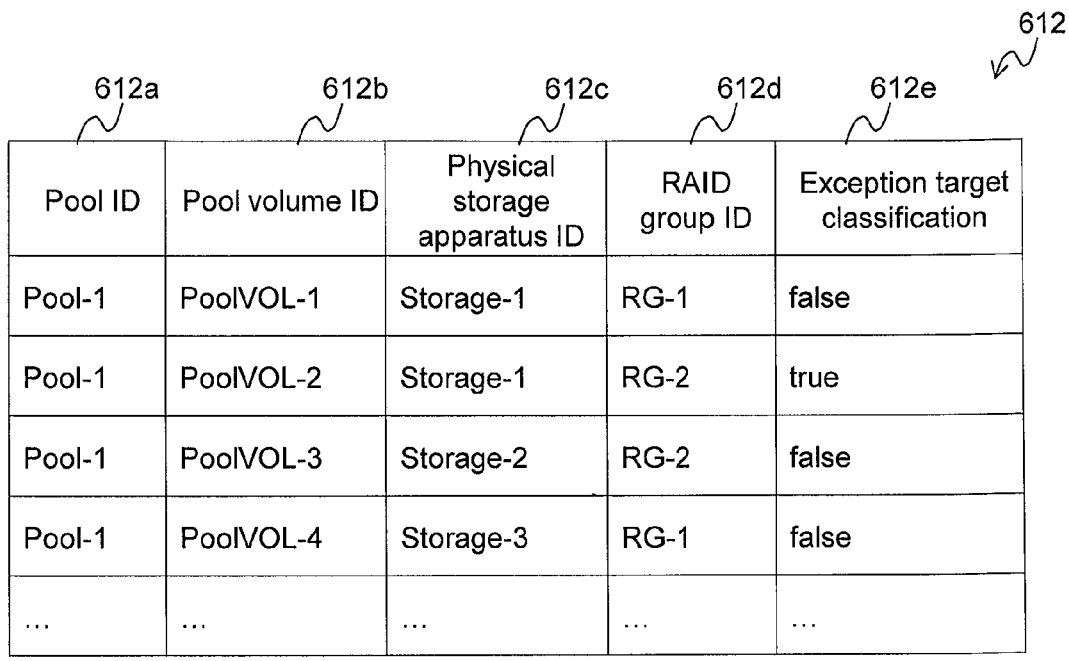
FIG. 13 is a configuration diagram of a pool volume table according to an embodiment.

FIG. 13 is a configuration diagram of the pool volume table according to an embodiment.

The pool volume table 612 is a table for managing information on logical volumes (pool volumes) constituting the pool 110, and stores, for each pool volume, entries including fields of a pool ID 612a, a pool volume ID 612b, a physical storage apparatus ID 612c, an RAID group ID 612d, and an exception target classification 612e.

The pool ID 612a stores a pool ID of the pool containing the pool volume. The pool volume ID 612b stores an ID of the pool volume. The physical storage apparatus ID 612c stores a physical storage apparatus ID of the physical storage apparatus 300 having the PDEV 340 on which the pool volume is based. The RAID group ID 612d stores identification information (an RAID group ID) of the RAID group on which the pool volume is based. The exception target classification 612e stores information indicating whether or not the pool volume corresponds to a pool volume to be excluded from migration destination of data on the logical page.

FIG. 14 is a configuration diagram of the RAID group table according to an embodiment.

The RAID group table 613 is a table for managing the usage of the RAID groups, and stores, for each RAID group, entries including fields of a physical storage apparatus ID 613a, an RAID group ID 613b, and a usage 613c.

The physical storage apparatus ID 613a stores a physical storage apparatus ID of the physical storage apparatus 300 having the PDEV 340 included in the RAID group associated with the entry. The RAID group ID 613b stores an RAID group ID of the RAID group. The usage 613c stores the usage of the storage area of the RAID group associated with the entry.

FIG. 15 is a configuration diagram of the apparatus-to-apparatus transfer rate table according to an embodiment.

The apparatus-to-apparatus transfer rate table 614 is a table for managing the transfer rate between the physical storage apparatuses 300, and stores entries including fields of a migration source storage 614a, a migration destination storage 614b, and a transfer rate 614c.

The migration source storage 614a stores a physical storage apparatus ID of the physical storage apparatus 300 that is a data migration source. The migration destination storage 614b stores a physical storage apparatus ID of the physical storage apparatus 300 that is a data migration destination. The transfer rate 614c stores the transfer rate at which data are migrated from the migration source physical storage apparatus 300 associated with the entry to the migration destination physical storage apparatus 300.

Next, various screens to be displayed on the management client 500 by the management computer 400 will be described.

FIG. 23 is a configuration diagram of a virtual logical volume selection screen according to an embodiment.

The virtual logical volume selection screen 2300 is a screen displayed on the management client 500 by the virtual logical volume selection unit 662 so as to receive selection of a target virtual logical volume that is a target of performance improvement from the administrator.

The virtual logical volume selection screen 2300 includes a virtual logical volume list display area 2310, a target virtual logical volume list display area 2320, an "Add" button 2330, an "Exclude" button 2340, an "Update response performance" button 2350, an "Enter" button 2360, a "Manually specify handling order" button 2370, a "Cancel" button 2380, and a "Display time required for handling" button 2390.

The virtual logical volume list display area 2310 displays information on each virtual logical volume managed in the storage system on each row. The information on each virtual logical volume is created on the basis of information on the virtual logical volume table 610 and the handling priority table 642. Specifically, information in the goal response performance column 2311 is created on the basis of the handling priority table 642. Note that the handling priority table 642 is created according to input to a handling priority configuration screen (not illustrated) displayed for configuring the priority of each virtual logical volume on the management client 500 by the handling priority configuration unit 661. Examples of the priority to be configured may be "high", "medium", and "low".

The target virtual logical volume list display area 2320 displays information on each target virtual logical volume selected as a target for handling for performance improvement on each row. The information on each target virtual logical volume is created on the basis of the information on the virtual logical volume table 610 and the handling priority table 642. In the present embodiment, the information on the target virtual logical volumes further includes a predicted required time column 2391 in addition to the information on the virtual logical volumes in the virtual logical volume list display area 2310.

The "Add" button 2330 is a button pressed for adding a virtual logical volume associated with a row in a selected state in the virtual logical volume list display area 2310 to the target virtual logical volumes that are targets of handling for performance improvement. When this button is pressed, the row of information on the virtual logical volume in the selected state is added into the target virtual logical volume list display area 2320.

The "Exclude" button 2340 is a button pressed for excluding a target virtual logical volume associated with a row in a selected state in the target virtual logical volume list display area 2320 from the targets of handling for performance improvement. When this button is pressed, the row of information on the target virtual logical volume in the selected state is deleted from the target virtual logical volume list display area 2320.

The "Update response performance" button 2350 is a button pressed for updating the response performance of the virtual logical volumes in the virtual logical volume list display area 2310 with latest information. When this button is pressed, the storage apparatus information collection unit 602 collects the latest response performances of the virtual logical volumes from the physical storage apparatuses 300 and reflects the collected response performances in the virtual logical volume list display area 2310.

The "Display time required for handling" button 2390 is a button pressed for displaying predicted required times on a predicted required time column 2391 in the target virtual logical volume list display area 2320. When this button is pressed, a migration time prediction process (see FIG. 20) is performed to display the predicted required times on the predicted required time column 2391. As a result, the administrator can properly know the time required for handing a target virtual logical volume.

The "Enter" button 2360 is a button pressed for confirming the target virtual logical volume selected in the virtual logical volume selection screen 2300. When this button is pressed, a target virtual logical volume displayed in the target virtual logical volume list 2320 is determined to be the target virtual logical volume to be actually handled, and the virtual logical volume selection unit 662 registers the information on the target virtual logical volume into the target virtual logical volume table 643.

The "Cancel" button 2380 is a button pressed for cancelling a selected target virtual logical volume in the virtual logical volume selection screen 2300. When this button is pressed, display of the virtual logical volume selection screen 2300 is terminated without determining a target virtual logical volume displayed in the target virtual logical volume list 2320 to be the target virtual logical volume to be actually handled.

The "Manually specify handling order" button 2370 is a button pressed for manually configuring the handling order in which multiple target virtual logical volumes are handled by the administrator. When this button is pressed, the virtual logical volume handling order sequencing unit 663 displays a virtual logical volume handling order determination screen 2400 (see FIG. 24) so as to receive specification of the handling order of the target virtual logical volumes from the administrator.

FIG. 24 is a configuration diagram of the virtual logical volume handling order determination screen according to an embodiment.

The virtual logical volume handling order determination screen 2400 is a screen displayed on the management client 500 by the virtual logical volume handling order sequencing unit 663 so as to receive specification of the order in which handling of target virtual logical volumes for performance improvement is performed from the administrator, and is displayed when the "Manually specify handling order" button 2370 in the virtual logical volume selection screen 2300 in FIG. 23 is pressed, for example.

The virtual logical volume handling order determination screen 2400 includes a virtual logical volume handling order display area 2410, a "Move up" button 2420, a "Move down" button 2430, an "Enter" button 2440, and a "Return" button 2450.

The virtual logical volume handling order display area 2410 displays rows of information on target virtual logical volumes in the current handling order of the target virtual logical volumes.

The "Move up" button 2420 is a button pressed for moving up the handling order of the target virtual logical volume on a selected row in the virtual logical volume handling order display area 2410. When this button is pressed, the corresponding target virtual logical volume is moved up by one in the handling order, and the row of the information on the target virtual logical volume in the virtual logical volume handling order display area 2410 is moved up by one row.

The "Move down" button 2430 is a button pressed for moving down the handling order of the target virtual logical volume on a selected row in the virtual logical volume handling order display area 2410. When this button is pressed, the corresponding target virtual logical volume is moved down by one in the handling order, and the row of the information on the target virtual logical volume in the virtual logical volume handling order display area 2410 is moved down by one row.

The "Enter" button 2440 is a button pressed for confirming the handling order of the target virtual logical volumes determined in the virtual logical volume handling order determination screen 2400. When this button is pressed, the virtual logical volume handling order sequencing unit 663 confirms the handling order of the target virtual logical volumes to be the order of the rows of the target virtual logical volumes displayed in the virtual logical volume handling order display area 2410, rearranges the entries of the target virtual logical volume table 643 according to the confirmed order, and closes the virtual logical volume handling order determination screen 2400. The virtual logical volume selection unit 662 then displays the rows of information on the target virtual logical volumes in the target virtual logical volume list display area 2320 according to the order of the entries stored in the target virtual logical volume table 643. As a result, the rows of information on the target virtual logical volumes are displayed in the order specified by the administrator.

The "Return" button 2450 is a button pressed for returning to the virtual logical volume selection screen 2300 without confirming the handling order of the target virtual logical volumes determined in the virtual logical volume handling order determination screen 2400. When this button is pressed, the virtual logical volume handling order sequencing unit 663 closes the virtual logical volume handling order determination screen 2400.

With the virtual logical volume handling order determination screen 2400, the administrator can determine the order in which the target virtual logical volumes are handled to be a desired order.

FIG. 25 is a configuration diagram of a goal response performance editing screen according to an embodiment.

The goal response performance editing screen 2500 is a screen displayed on the management client 500 by the goal response performance configuration unit 660 so as to receive the goal response performance and the non-attainment permissible time for a virtual logical volume from the administrator.

The goal response performance editing screen 2500 includes a configuration target virtual logical volume display area 2510, a goal response performance specification area 2520, a goal response performance input area 2530, a non-attainment permissible time input area 2560, a "Determine" button 2540, and a "Cancel" button 2550.

The configuration target virtual logical volume display area 2510 displays information on each virtual logical volume managed in the storage system on each row. The information on each virtual logical volume is created on the basis of the information in the virtual logical volume table 610. In the configuration target virtual logical volume display area 2510, a row of information on a virtual logical volume to be edited is selected and specified to allow configuration by using the goal response performance specification area 2520, the goal response performance input area 2530, and the non-attainment permissible time input area 2560.

A slide bar is displayed in the goal response performance specification area 2520, allowing specification of the goal response performance by moving a mark for specification. Note that the goal response performance specified by using the goal response performance specification area 2520 is displayed in a numeric value in the goal response performance input area 230.

The goal response performance input area 2530 displays the value of the goal response performance specified by using the goal response performance specification area 2520. Note that the goal response performance input area 2530 can also receive input of a value of the goal response performance.

The non-attainment permissible time input area 2560 is an area for inputting the time (non-attainment permissible time) during which non-attainment of the goal response performance is permitted.

The "Determine" button 2540 is a button pressed for confirming the goal response performance and the non-attainment permissible time edited in the goal response performance editing screen 2500. When this button is pressed, the goal response performance configuration unit 660 configures the values input in the goal response performance input area 2530 and the non-attainment permissible time input area 2560 into the goal response performance 610i and the non-attainment permissible time 610k of the entries associated with the virtual logical volume to be edited in the virtual logical volume table 610, and into the goal response performance 643f of the entries associated with the virtual logical volume to be edited in the target virtual logical volume table 643.

The "Cancel" button 2550 is a button pressed for cancelling the goal response performance and the non-attainment permissible time edited in the goal response performance editing screen 2500. When this button is pressed, the goal response performance configuration unit 660 closes the goal response performance editing screen 2500.

Next, processing operation in the storage system according to the present embodiment will be described.

Figure 16:
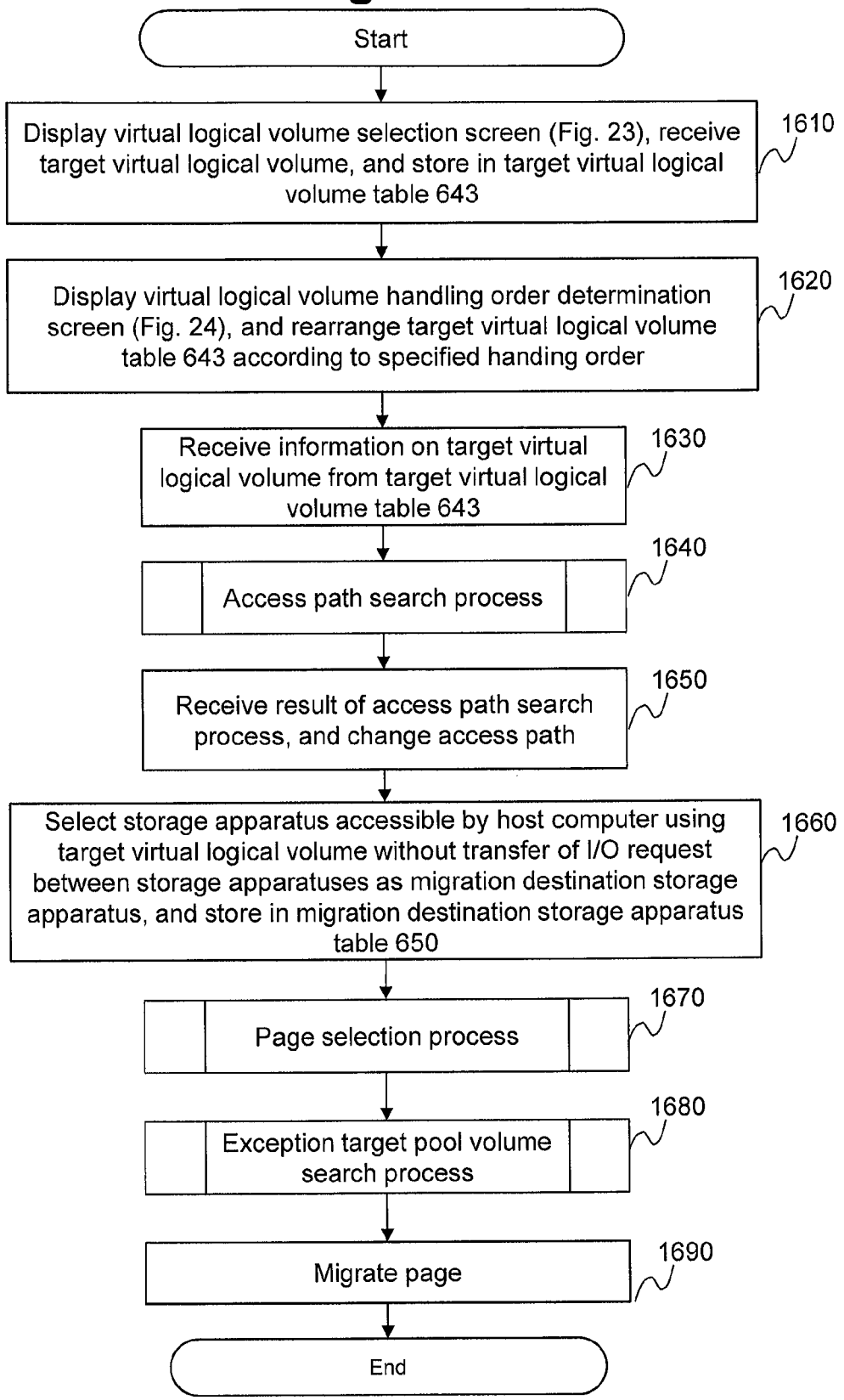
FIG. 16 is a flowchart of a virtual logical volume management process according to an embodiment.

FIG. 16 is a flowchart of a virtual logical volume management process according to an embodiment.

In the virtual logical volume management process, the virtual logical volume selection unit 662 first displays the virtual logical volume selection screen 2300 (see FIG. 23) on the management client 500 on the basis of the virtual logical volume table 610, receives selection of a target virtual logical volume made by the administrator from the management client 500, and stores information on the target virtual logical volume in the target virtual logical volume table 643 (step 1610).

Note that the virtual logical volume selection unit 662 may display all the virtual logical volumes in the storage system or some virtual logical volumes obtained by narrowing down multiple virtual logical volumes as candidates for selecting a target virtual logical volume on the virtual logical volume selection screen 2300. The method for narrowing multiple virtual logical volumes down to some virtual logical volumes may be based on any condition of (A) virtual logical volumes that have not attained the goal response performance at the time point, (B) virtual logical volumes that have not attained the goal response performance continuously for a certain period of time (a time period specified by the administrator, for example) or longer or had not attained the goal response performance continuously for the certain period of time or longer, and (C) virtual logical volumes with high priority configured in advance, or a combination of any of (A) to (C). In this manner, selection of a target virtual logical volume by the administrator can be made easier and more proper.

Although the administrator selects a target virtual logical volume in the virtual logical volume selection screen 2300 in the present embodiment, a virtual logical volume that has not attained the goal response performance at the time point, a virtual logical volume that has not attained the goal response performance continuously for a certain period of time (a time period specified by the administrator, for example) or longer or had not attained the goal response performance continuously for the certain period of time or longer, or a virtual logical volume with high priority configured in advance may be determined to be a target virtual logical volume. In this manner, the target virtual logical volume can be properly determined.

Subsequently, the virtual logical volume selection unit 662 displays a virtual logical volume handling order determination screen (see FIG. 24) on the management client 500 on the basis of the target virtual logical volume table 643, receives specification of the handling order of the target virtual logical volumes made by the administrator from the management client 500, and rearranges the order of entries of the respective target virtual logical volumes in the target virtual logical volume table 643 according to the specified handling order (step 1620).

Subsequently, the access path search unit 636 receives information (such as target virtual logical volume IDs) on the target virtual logical volumes from the target virtual logical volume table 643 (step 1630), and performs an access path search process (see FIG. 22) (step 1640). In the access path search process, a physical storage apparatus 300 appropriate for a window for a target virtual logical volume is determined.

Subsequently, the port change control unit 606 receives the result of the access path search process from the access path search unit 636, and changes the access path to use the physical storage apparatus 300 contained in the result as the window (step 1650). Specifically, the port change control unit 606 performs control to change the access path to the physical storage apparatus 300 contained in the result in the entry associated with the target virtual logical volume in the path management table 620 (more specifically, sets the access path classification 620f of the entry associated with the physical storage apparatus 300 to "true", and the access path classifications 620f of the entries associated with other physical storage apparatuses 300 to "false"), and to make the multipath management program 222 of the host computer 200 change the path for which the physical storage apparatus contained in the result is a window to be the access path in the path management table 223. As a result, the access path can be changed to a path for which an appropriate physical storage apparatus 300 is a window.

Subsequently, the migration destination storage apparatus selection unit 630 selects a physical storage apparatus 300 that is a window for the host computer 200 using the target virtual logical volume, that is, a physical storage apparatus 300 configured to be accessible by the host computer 200 without transfer of an I/O request between physical storage apparatuses 300 as a physical storage apparatus (migration destination physical storage apparatus) that is a migration destination to which data on the logical page of the target virtual logical volume is to be migrated on the basis of the information on the target virtual logical volume in the target virtual logical volume table 643 and the information in the path management table 620, and registers the migration destination physical storage apparatus in the migration destination storage apparatus table 650 (step 1660). Since this migration destination physical storage apparatus has better response performance than the other physical storage apparatuses 300, the response performance can be improved by migrating data on the logical page to this physical storage apparatus.

Subsequently, the page selection unit 632 performs a page selection process (see FIG. 17) (step 1670). As a result of the page selection process, a migration target logical page is selected.

Subsequently, the exception target pool volume search unit 634 performs an exception target pool volume search process (see FIG. 19) (step 1680). As a result of the exception target pool volume search process, a pool volume to be excluded from migration destination of data on the logical page is determined.

Subsequently, the page migration control unit 605 determines a pool volume to which a migration target page is to be migrated on the basis of the page migration management table 653 and the pool volume table 612, and migrates data on the migration target page to the pool volume (step 1690). Specifically, the page migration control unit 605 migrates data on the migration target page (a page for which the migration target classification 653g of the entry in the page migration management table 653 is "true") to a physical page in the pool volume other than the exception target pool volume. As a result of this process, since the logical page in the virtual logical volume can be migrated to a storage area of a PDEV 340 in the physical storage apparatus 300 with high response performance, the response performance of the virtual logical volume can be improved. The "high response performance" may mean the highest response performance or may mean a relatively high response performance (specifically, a response performance within top P % (P>0), for example). Conversely, the "low response performance" may mean the lowest response performance or may mean a relatively low response performance (specifically, a response performance within bottom Q % (Q is equal to or smaller than (100−P); Q>0)).

When multiple logical pages are to be migrated in step 1690, the order in which the logical pages are migrated may be determined according to any of the following methods (1) to (3):

(1) referring to the sorted page migration management table 654, and determining the migration order of the pages in descending order of the response performance improvement effect;

(2) determining the migration order on the basis of the IOPS in the IOPS 611e of the page table 611; for example, determining the migration order of the pages in descending order of the IOPS; and (3) determining the migration order on the basis of the priority of the virtual logical volumes in the handling priority table 642.

Note that "high improvement effect" may mean the highest improvement effect or may mean a relatively high improvement effect. Conversely, "low improvement effect" may mean the lowest improvement effect or may mean a relatively low improvement effect.

As a result of determining the migration order of logical pages in this manner, the logical pages can be migrated in proper order. For example, according to the method (1), the response performance can be improved early. Alternatively, according to the method (2), a page with a large IOPS, for example, can be migrated early and the I/O process can be effectively performed. Alternatively, according to the method (3), the response performance of a virtual logical volume with a high configured priority can be improved early.

Figure 17:
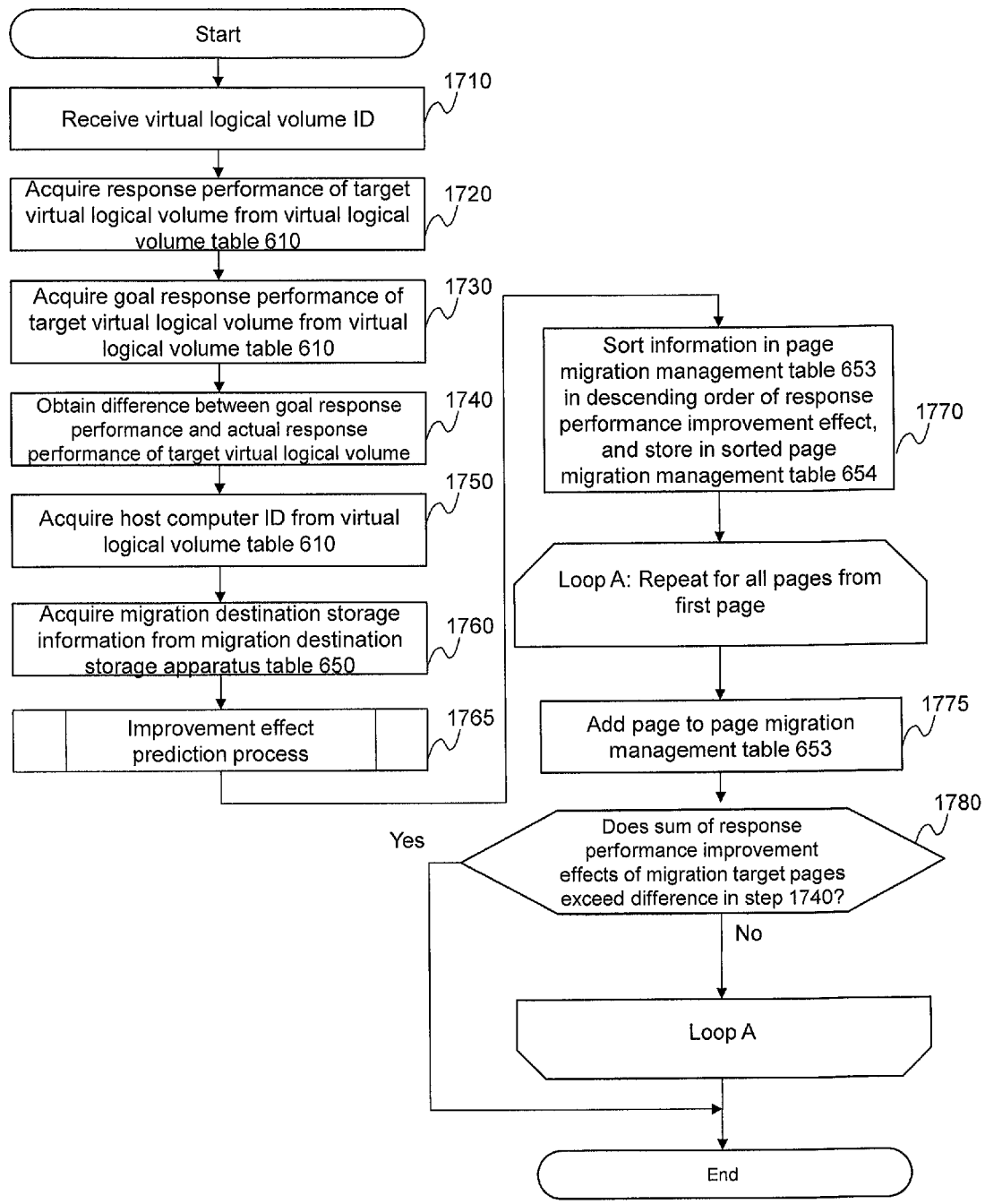
FIG. 17 is a flowchart of a page selection process according to an embodiment.

FIG. 17 is a flowchart of the page selection process according to an embodiment.

The page selection process is a process corresponding to step 1670 in the virtual logical volume management process (see FIG. 16).

In the page selection process, the page selection unit 632 receives a virtual logical volume ID of the target virtual logical volume (step 1710). Subsequently, the page selection unit 632 identifies an entry associated with the virtual logical volume ID on the basis of the virtual logical volume table 610, acquires the response performance in the response performance 610f of the entry (step 1720), and further acquires the goal response performance in the goal response performance 610i (step 1730).

Subsequently, the page selection unit 632 obtains a difference between the acquired goal response performance and response performance (step 1740).

Furthermore, the page selection unit 632 acquires a host computer ID in the host computer ID 610d on the basis of the identified entry (step 1750). Subsequently, the page selection unit 632 acquires a physical storage apparatus ID of the migration destination storage apparatus from the migration destination storage apparatus table 650 (step 1760).

Subsequently, the page selection unit 632 performs an improvement effect prediction process (see FIG. 18) on the basis of the host computer ID, the physical storage apparatus ID of the migration destination storage apparatus, and the virtual logical volume ID of the target virtual logical volume (step 1765). As a result of the improvement effect prediction process, the response performance improvement effect of migrating the logical page in the virtual logical volume can be known.

Subsequently, the page selection unit 632 sorts the entries in the page migration management table 653 in descending order of response performance improvement effect, and stores the sorting result into the sorted page migration management table 654 (step 1770).

Subsequently, the page selection unit 632 performs processing of processes of a loop A (steps 1775 and 1780) for logical pages associated with all the entries from a logical page associated with the first entry in the sorted page migration management table 654.

In step 1775 in the processes of the loop A, the page selection unit 632 adds information ("true" in the present embodiment) indicating that the processing target logical page is a migration target page to the migration target classification 653g of the entry, in the page migration management table 653, associated with the processing target logical page.

In step 1780, the page selection unit 632 determines whether or not a sum of the performance improvement effects resulting from migration of all the logical pages that are migration target pages exceeds the difference calculated in step 1740. If the sum of the performance improvement effects exceeds the difference (Yes in step 1780), this means that the response performance of the target virtual logical volume is equal to or larger than the goal response performance as a result of migrating all the logical pages that are migration target pages at the time point, and the page selection unit 632 thus exits the loop A and terminates the page selection process without any additional logical pages as migration target pages. If the sum of the performance improvement effects does not exceed the difference (No in step 1780), the page selection unit 632 performs the processes in the loop A on a logical page associated with the next entry, and if the processes of loop A are completed on the logical pages associated with all the entries in the sorted page migration management table 654, the page selection unit 632 exits the loop A and terminates the page selection process. According to the processes of the loop A, a logical page with a higher performance improvement effect is preferentially selected as a migration target page, which allows effective performance improvement with migration of a small number of pages. Furthermore, since only minimum logical pages required to attain the goal response performance are selected as migration target pages, the goal response performance can be attained by migration of a small number of logical pages.

Figure 18:
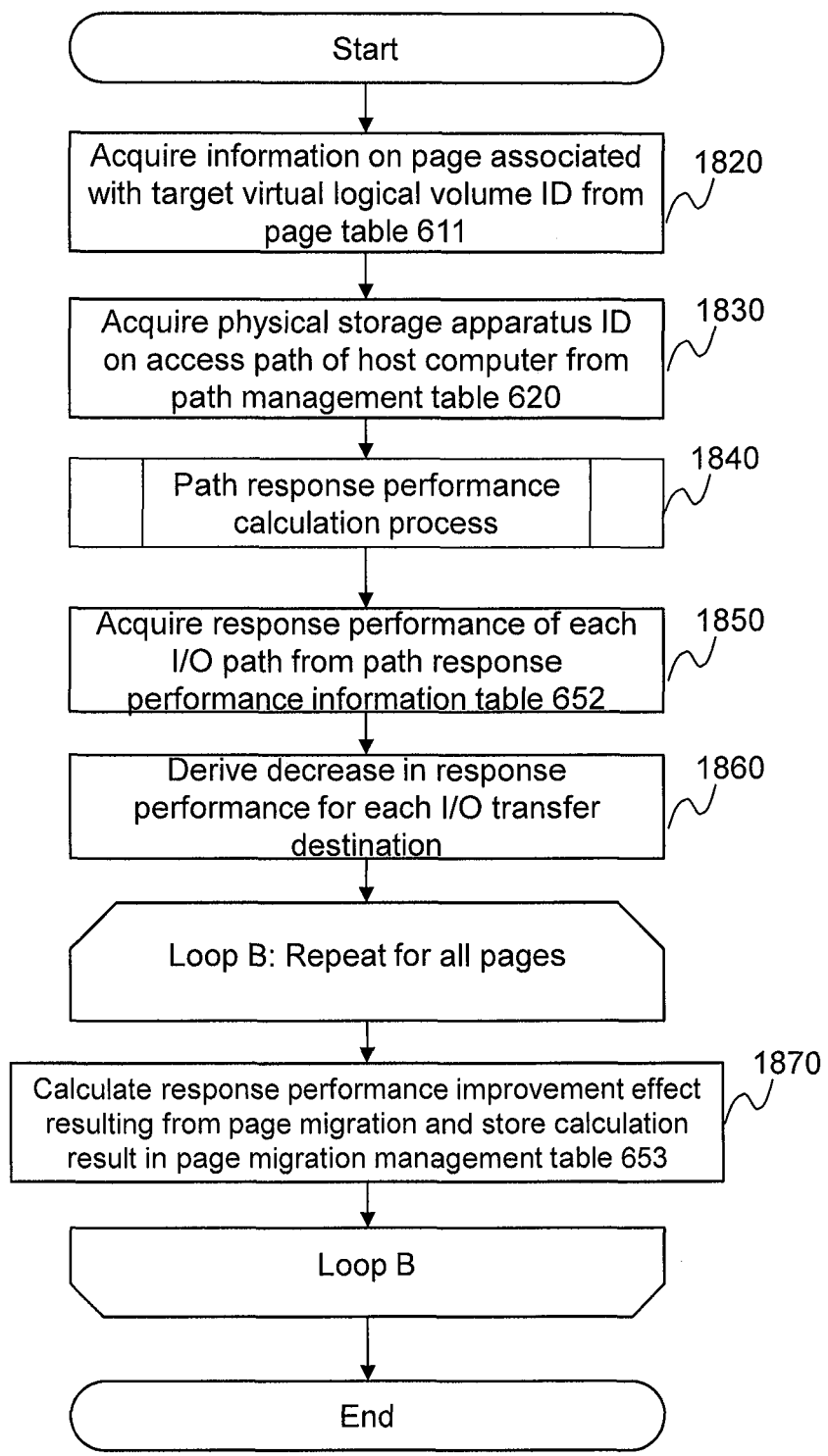
FIG. 18 is a flowchart of an improvement effect prediction process according to an embodiment.

FIG. 18 is a flowchart of the improvement effect prediction process according to an embodiment.

The improvement effect prediction process is a process corresponding to step 1765 in the page selection process (see FIG. 17).

The page selection unit 632 acquires an entry of a logical page associated with a target virtual logical volume ID from the page table 611 (step 1820). The page selection unit 632 stores the acquired entry in the narrowed-down page table 651. Although the storage apparatus information collection unit 602 acquire information on all the pages from the physical storage apparatus 300, registers the information in the page table 611, and then, in step 1820, extracts a page of a target virtual logical volume from the page table 611 in the present embodiment, the page selection unit 632 may request the storage apparatus information collection unit 602 to acquire information on only a page associated with a target virtual logical volume from the physical storage apparatuses 300 to make the storage apparatus information collection unit 602 to acquire information on only the page associated with the target virtual logical volume from the physical storage apparatuses 300 in step 1820, for example. In this manner, the amount of data acquired from the physical storage apparatuses 300 can be reduced and the capacity of the storage area consumed in the memory 420 can be reduced.

The page selection unit 632 acquires a physical storage apparatus ID of the physical storage apparatus 300 on the access path associated with the host computer ID of the host computer that uses the target virtual logical volume from the path management table 620 (step 1830).

Subsequently, the page selection unit 632 transmits the virtual logical volume ID of the target virtual logical volume to the path response performance calculation unit 631 to perform a path response performance calculation process (see FIG. 21) (step 1840). As a result of the path response performance calculation process, the response performance of each path for the target virtual logical volume is calculated and registered in the path performance information table 652.

Subsequently, the page selection unit 632 acquires performance information of each I/O path from the path performance information table 652 (step 1850), and derives a decrease in response performance for each path (I/O transfer path) through which I/O is transferred (step 1860). Specifically, the page selection unit 632 derives the decrease in response performance of each I/O transfer path by obtaining a difference between the response performance of a path that does not require I/O transfer and the response performance of the I/O transfer path.

Subsequently, the page selection unit 632 performs the process (step 1870) of a loop B on all the pages acquired in step 1820. In step 1870, the page selection unit 632 calculates a predicted value to which the response performance of the target virtual logical volume improves when the data on the logical page are migrated to a physical storage apparatus 300 on a path (access path) that does not require I/O transfer from the physical storage apparatus 300 in which the data are currently stored, and stores the predicted value in the response performance improvement effect 653f of an entry associated with the logical page in the page migration management table 653. Note that the predicted value is calculated by the following expression, for example:

Predicted value=(decrease in response performance resulting from I/O transfer of I/O path for accessing to data on target logical page in step 1870) (IOPS of target logical page in step 1870)/(total IOPS of virtual logical volumes).

The page selection unit 632 then performs the process (step 1870) of the loop B on all the pages acquired in step 1820, and then terminates the improvement effect prediction process.

Figure 19:
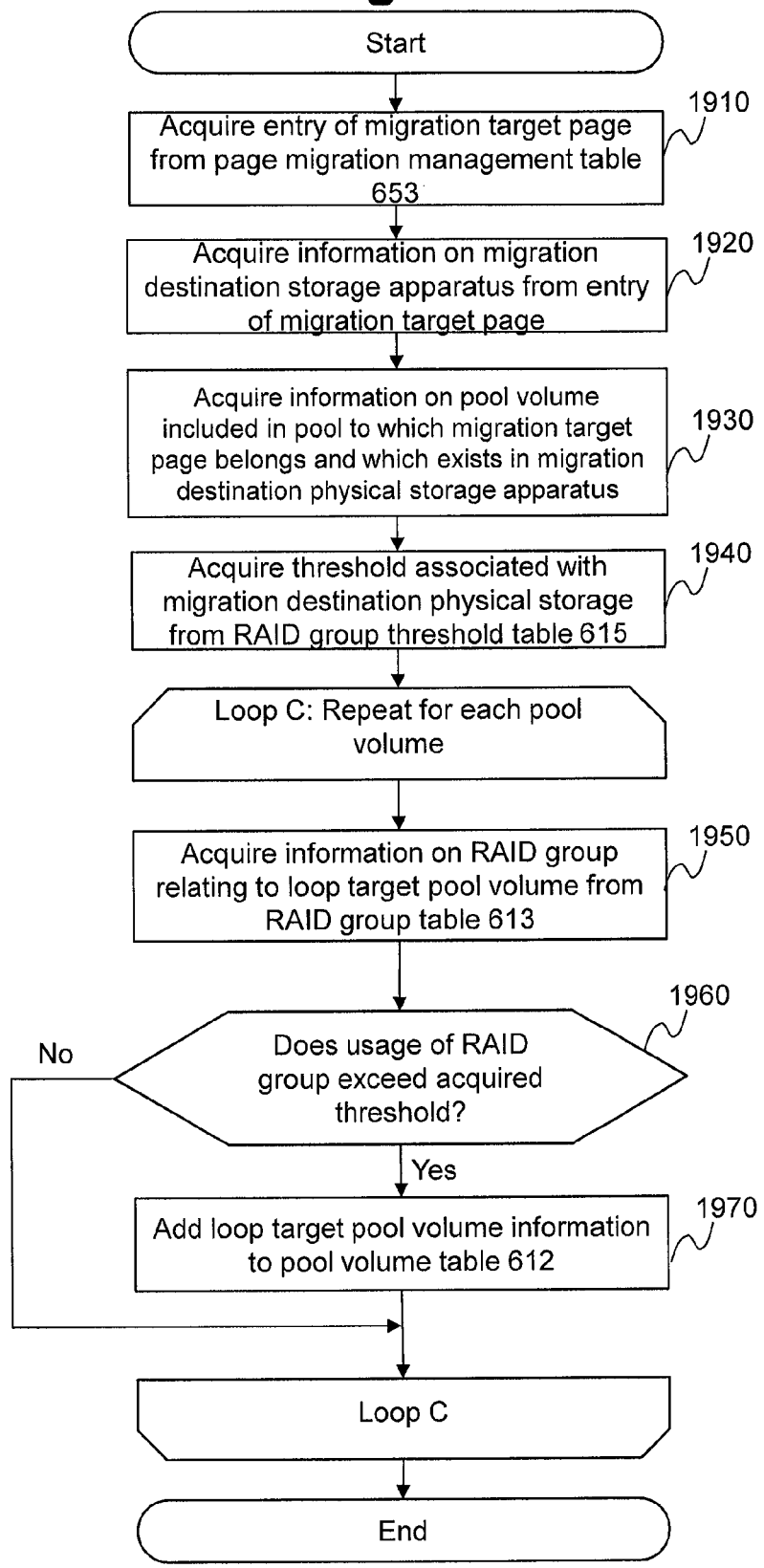
FIG. 19 is a flowchart of an exception target pool volume search process according to an embodiment.

FIG. 19 is a flowchart of the exception target pool volume search process according to an embodiment.

The exception target pool volume search process is a process corresponding to step 1680 in the virtual logical volume management process (see FIG. 16).

The exception target pool volume search unit 634 acquires an entry of a migration target page from the page migration management table 653 (step 1910). Subsequently, the exception target pool volume search unit 634 acquires a physical storage apparatus ID of a migration destination physical storage apparatus on the basis of the acquired entry (step 1920).

Subsequently, the exception target pool volume search unit 634 acquires information (such as an RAID group ID) on a pool volume included in a pool to which the migration target page belongs and which exists in the migration destination physical storage apparatus from the pool volume table 612 (step 1930).

Subsequently, the exception target pool volume search unit 634 acquires a threshold associated with the migration destination physical storage apparatus from the RAID group threshold table 615 (step 1940).

Subsequently, the exception target pool volume search unit 634 performs processes (steps 1950 to 1970) of a loop C on each pool volume acquired in step 1930.

Specifically, the exception target pool volume search unit 634 acquires a usage associated with the RAID group ID of an RAID group included in the processing target pool volume from the RAID group table 613 (step 1950). Subsequently, the exception target pool volume search unit 634 determines whether or not the acquired usage of the RAID group exceeds the threshold acquired in step 1940 (step 1960). If the acquired usage of the RAID group exceeds the threshold acquired in step 1940 as a result of the determination (Yes in step 1960), the exception target pool volume search unit 634 configures the exception target classification 612e of the entry associated with the processing target pool volume in the pool volume table 612 to be "true" so that data on the migration target page will not be migrated to the pool volume (step 1970) and performs the processes of the loop C on the next pool volume. If the acquired usage of the RAID group does not exceed the threshold acquired in step 1940 (No in step 1960), the exception target pool volume search unit 634 performs the processes of the loop C on the next pool volume.

After performing the processes of the loop C on each pool volume acquired in step 1930, the exception target pool volume search unit 643 then terminates the exception target pool volume search process.

According to the exception target pool volume search process, a pool volume where the usage of the RAID group on which the pool volume is based exceeds the threshold can be searched for, and the pool volume can be excluded from the migration destinations of the data on the logical page.

Figure 20:
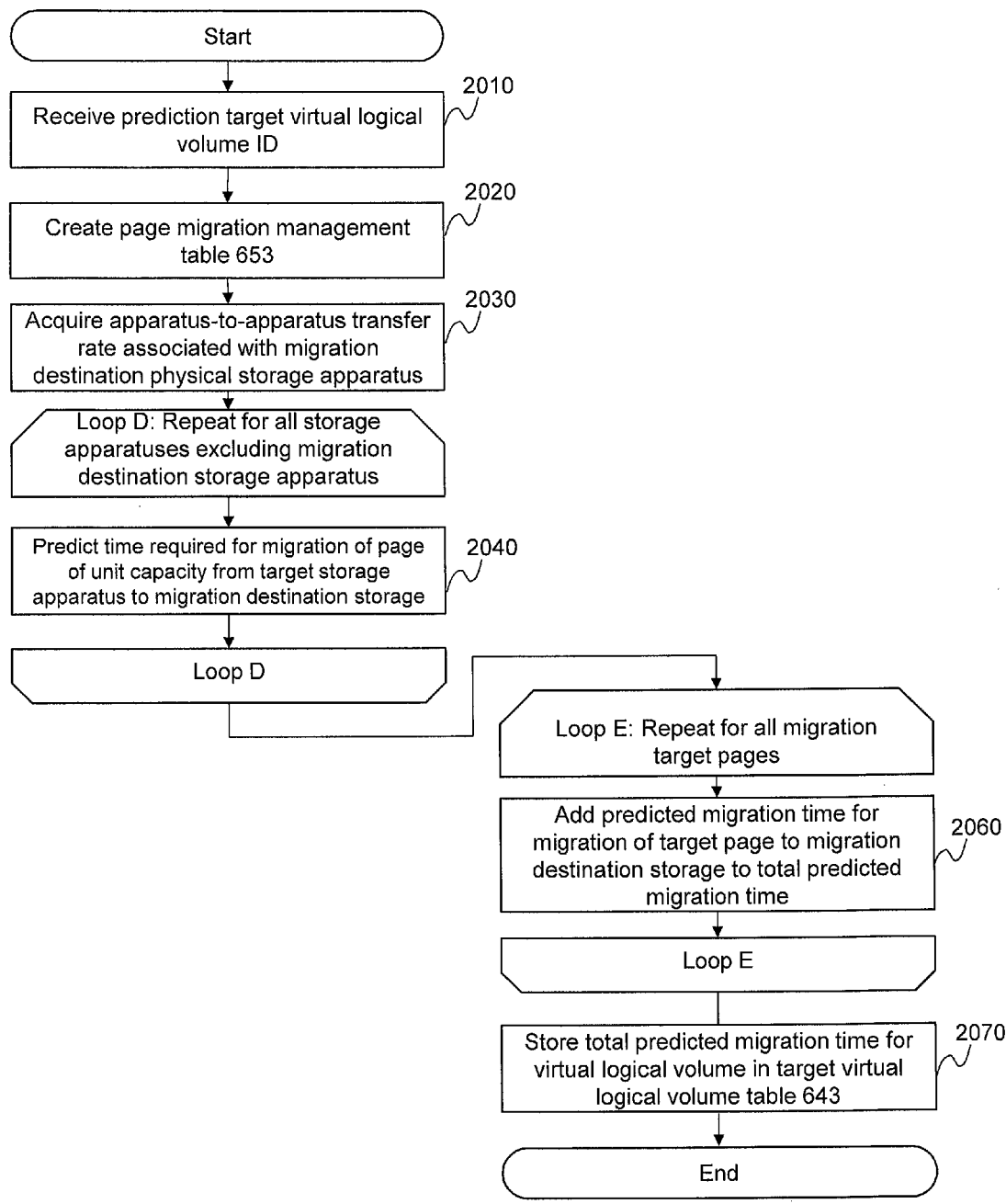
FIG. 20 is a flowchart of a migration time prediction process according to an embodiment.

FIG. 20 is a flowchart of a migration time prediction process according to an embodiment.

The migration time prediction process is performed when the "Display time required for handling" button 2390 in the virtual logical volume selection screen 2300 (see FIG. 23) is pressed, for example. Note that, when the "Display time required for handling" button 2390 is pressed, the virtual logical volume ID of a virtual logical volume displayed on the target virtual logical volume list 2320 or the virtual logical volume ID of the virtual logical volume selected on the target virtual logical volume list 2320 is passed as the prediction target virtual logical volume ID to the page migration time prediction unit 635.

The page migration time prediction unit 635 receives the virtual logical volume ID of the prediction target virtual logical volume (step 2010). Subsequently, the page migration time prediction unit 635 causes the migration destination storage apparatus selection unit 630 and the page selection unit 632 to create the page migration management table 653 (step 2020). Note that the creation of the page migration management table 653 by the migration destination storage apparatus selection unit 630 and the page selection unit 632 is performed similarly to the creation of the page migration management table 653 in other flowcharts.

Subsequently, the page migration time prediction unit 635 acquires an apparatus-to-apparatus transfer rate associated with the migration destination physical storage apparatus from the apparatus-to-apparatus transfer rate table 614 (step 2030).

Subsequently, the page migration time prediction unit 635 repeats a process (step 2040) of a loop D for all the physical storage apparatuses excluding the migration destination physical storage apparatus. Specifically, the page migration time prediction unit 635 predicts time (page migration predicted time) required for migration of data of one page that is a predetermined unit capacity from the processing target physical storage apparatus 300 to the migration destination physical storage apparatus on the basis of the transfer rate acquired in step 2030 (step 2040). After performing the process (step 2040) of the loop D on all the physical storage apparatuses excluding the migration destination physical storage apparatus, the page migration time prediction unit 635 then exits the loop D.

Subsequently, the page migration time prediction unit 635 repeats a process (step 2060) of a loop E on all the migration target pages. Specifically, the page migration time prediction unit 635 adds a page migration predicted time required for migration of data on the page subjected to the loop process to the migration destination physical storage apparatus to a total migration predicted time (whose initial value is 0) (step 2060). Alternatively, the number of pages to be migrated from each migration source physical storage apparatus 300 to the migration destination physical storage apparatus 300 may be obtained, and the total migration predicted time may be calculated by multiplying the number of pages by the page migration predicted time.

After performing the process (step 2060) of the loop E on all the migration target pages, the page migration time prediction unit 635 then exits the loop E, stores the total migration predicted time in the predicted required time 643h of the entry associated with the prediction target virtual logical volume in the target virtual logical volume table 643 (step 2070), and terminates the migration time prediction process. When multiple prediction target virtual logical volume IDs are acquired, the page migration time prediction unit 635 performs the process of FIG. 20 for each virtual logical volume ID.

According to the migration time prediction process, the time required for migrating data on a migration target page of a target virtual logical volume can properly predicted, and the resulting information can be notified to the administrator. As a result, the administrator can take various measures taking the time for migrating data on a migration target page of a target virtual logical volume into consideration.

Figure 21:
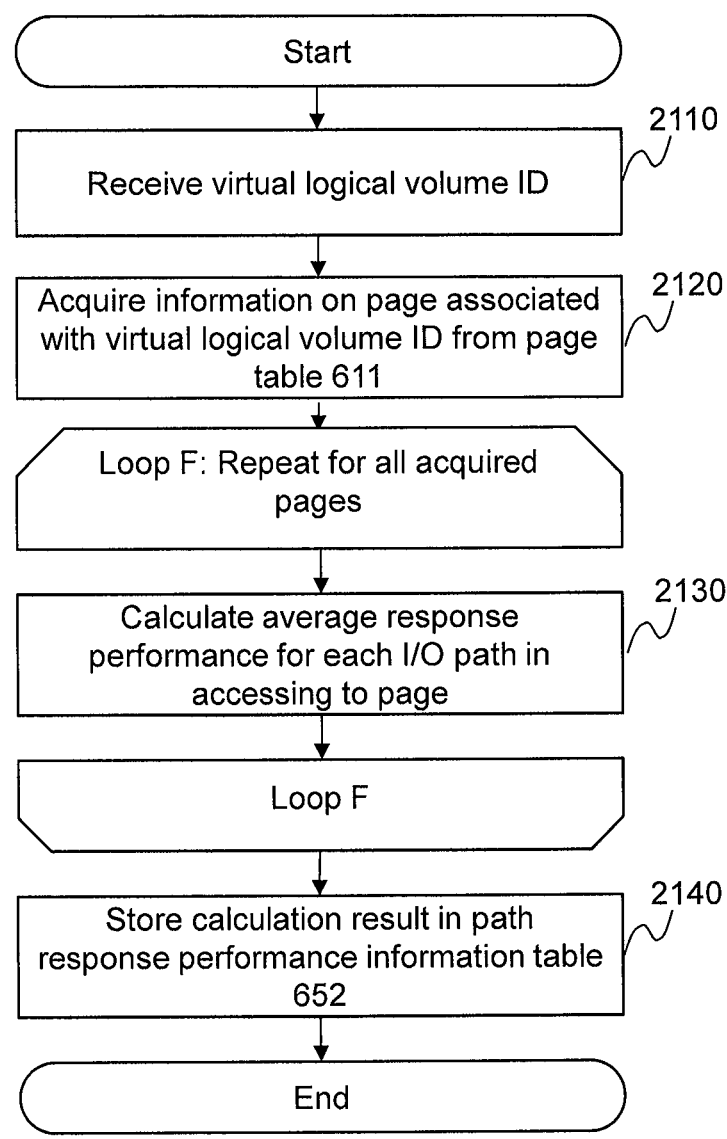
FIG. 21 is a flowchart of a path response performance calculation process according to an embodiment.

FIG. 21 is a flowchart of the path response performance calculation process according to an embodiment.

The path response performance calculation process is a process corresponding to step 1840 in the improvement effect prediction process (see FIG. 18).

The path response performance calculation unit 631 receives a virtual logical volume ID (step 2110), and acquires entries of all pages associated with the virtual logical volume ID from the page table 611 (step 2120).

Subsequently, the path response performance calculation unit 631 repeats a process (step 2130) of a loop F on all the acquired pages. Specifically, the path response performance calculation unit 631 tallies the response performance (the response performance in the response performance 611f of the entry) for each page for each I/O path (for each physical storage apparatus ID, for example) to the page, and calculates an average value of the response performance for each I/O path (step 2130).

After performing the process (step 2130) of the loop F on all the pages, the path response performance calculation unit 631 exits the loop F, stores the calculation result of the loop F in the path performance information table 652 (step 2140), and terminates the path response performance calculation process.

According to the path response performance calculation process, the actual response performance of each path can be properly calculated.

Figure 22:
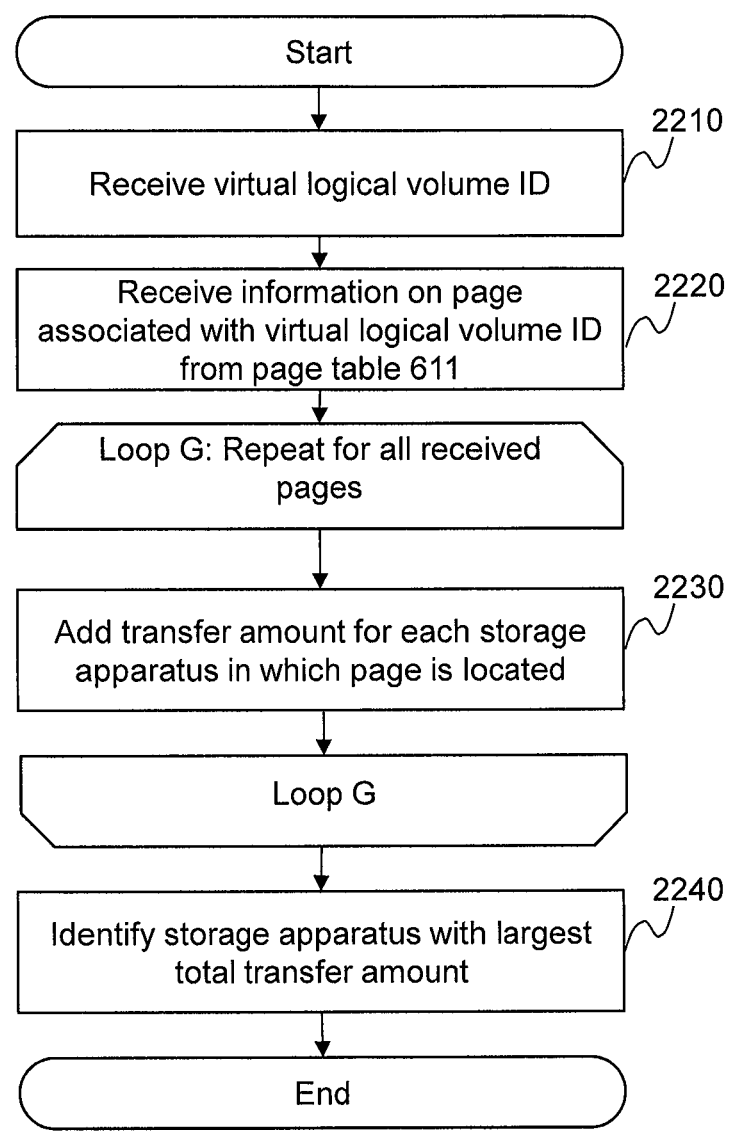
FIG. 22 is a flowchart of an access path search process according to an embodiment.

FIG. 22 is a flowchart of the access path search process according to an embodiment.

The access path search process is a process corresponding to step 1640 in the virtual logical volume management process (see FIG. 16).

The access path search unit 636 receives a virtual logical volume ID (step 2210), and acquires entries of all the pages associated with the virtual logical volume ID from the page table 611 (step 2220).

Subsequently, the access path search unit 636 repeats a process (step 2230) of a loop G on all the acquired pages. Specifically, the access path search unit 636 adds the transfer amount in the acquired amount 611g of the acquired entry to the total transfer amount for the physical storage apparatus 300 in which data of the page are stored (step 2230).

After performing the process (step 2230) of the loop G for all the pages, the access path search unit 636 then exits the loop G, identifies the physical storage apparatus 300 with the largest total transfer amount in the calculation result of the loop G, determines the access path for receiving an I/O request for the processing target virtual logical volume to be the path for which the identified physical storage apparatus 300 is the window, passes this result to the port change control unit 606 (step 2240), and terminates the access path search process. According to the access path search process, since a physical storage apparatus 300 with a large total transfer amount can be determined to be a window of an I/O request for a processing target virtual logical volume, the transfer amount of data between physical storage apparatuses 300 in response to an I/O request for the virtual logical volume can be reduced by changing the access path accordingly, and the I/O performance including the response performance of the virtual logical volume can be improved.

While embodiments of the present invention have been described above, the present invention is not limited to the embodiments but, needless to say, can be modified in various manners without departing from the gist thereof.

REFERENCE SIGNS LIST

200 host computer
300 physical storage apparatus
400 management computer

The invention claimed is:

1. A storage system comprising:
    a plurality of storage apparatuses configured to provide a virtual logical volume composed of a plurality of logical pages to a host computer, receive an I/O (Input/Output) request from the host computer, allocate a physical page to one of the logical pages identified on the basis of I/O request when the I/O request is a write request, and write target data of the write request in the allocated physical page; and
    a management computer configured to manage the storage apparatuses, wherein
    the management computer is configured to:
        determine one of the logical pages that is a target of data migration to attain a volume goal response performance on the basis of access path information that identifies one of the storage apparatuses that receives an I/O request in which the virtual logical volume is specified by the host computer, an actual volume response performance of a processing target virtual logical volume, the volume goal response performance to be attained, a page response performance of the logical pages in the virtual logical volume, and storage destination information that identifies one of the storage apparatuses in which the physical page allocated to the one of the logical pages is present, and
        migrate data in the physical page allocated to the target logical page from the one of the storage apparatuses having the physical page allocated to the target logical page to another physical page of another one of the storage apparatuses.

2. The storage system according to claim 1,
wherein the management computer is configured to
    acquire a response performance of each of a plurality of I/O paths to the storage apparatuses in accessing the virtual logical volume, and
    estimate a volume response performance of the virtual logical volume when each of the logical pages is migrated on the basis of I/O frequency to each of the logical pages of the virtual logical volume and the response performance of each path to determine the target logical page on the basis of the estimated volume response performance.

3. The storage system according to claim 2,
wherein the management computer is configured to determine the one of the logical pages, as the target logical page, satisfying a definition of high improvement effect on the volume response performance.

4. The storage system according to claim 3,
wherein the management computer is configured to determine the target logical page to improve the actual volume response performance of the virtual logical volume to equal to or higher than the volume goal response performance.

5. The storage system according to claim 1,
wherein the management computer is configured to determine one of the storage apparatuses that receives an I/O request from the host computer using the virtual logical volume to be a migration destination storage apparatus of data in the physical page allocated to the one of the logical pages.

6. The storage system according to claim 1,
wherein the management computer is configured to acquire the page response performance and the storage destination apparatus information only for the logical pages of the processing target virtual logical volume from each of the storage apparatuses.

7. The storage system according to claim 1,
wherein a migration destination storage apparatus to which data of the logical pages are to be migrated includes a plurality of logical volumes, and
wherein the management computer is configured to:
    acquire a usage of each of the logical volumes in the migration destination storage apparatus, and
    preferentially determine one of the logical volumes with a lower usage of the migration destination storage apparatus to be a migration destination of the data in the physical page allocated to the target one of the logical pages.

8. The storage system according to claim 1,
wherein the management computer is configured to, for migration of data in the logical pages, migrate data in physical pages allocated to the respective logical pages on the basis of at least one of descending order of volume response performance improvement effect achieved by migration of data in the logical pages, descending order of I/O frequency of the respective logical pages, and priority associated with the respective logical pages.

9. The storage system according to claim 1,
wherein the management computer is configured to:
determine one of the storage apparatuses with the largest data transfer amount for the virtual logical volume to be the one of the storage apparatuses receiving the I/O request for the virtual logical volume, and
output an indication to switch an access path of the host computer using the virtual logical volume to the one of the storage apparatuses.

10. The storage system according to claim 1,
wherein the management computer is configured to determine candidate processing target virtual logical volumes from among a plurality of virtual logical volumes provided by the storage apparatuses on the basis of at least one of the following conditions:
(A) the volume goal response performance of the virtual logical volumes is not satisfied;
(B) a state in which the volume goal response performance of the virtual logical volumes is not satisfied has continued for a predetermined time or longer; and
(C) a priority configured for the virtual logical volumes in advance is high, and
wherein processing target virtual logical volume is selected from the candidate processing target virtual logical volumes.

11. The storage system according to claim 1,
wherein the management computer is configured to:
estimate a time required for completing migration of data in the determined one of the logical pages, and
display the estimated time on a predetermined screen.

12. The storage system according to claim 11,
wherein the management computer is configured to:
obtain migration time per a predetermined data amount between a migration source storage apparatus and a migration destination storage apparatus of data in the logical pages determined to be migration targets on the basis of a transfer rate between the storage apparatuses,
obtain a number of the logical pages determined to be migration targets for each migration source storage apparatus, and
obtain a predicted required time for each migration source storage apparatus required for completing data migration from the migration source storage apparatus to the migration destination storage apparatus on the basis of the migration time and the number of the logical pages, and obtain a predicted required time required for completing data migration from every migration source storage apparatus to each migration destination storage apparatus on the basis of the predicted required time for each migration source storage apparatus.

13. A management computer coupled to a plurality of storage apparatuses configured to provide a virtual logical volume composed of a plurality of logical pages to a host computer, receive an I/O (Input/Output) request from the host computer, allocate a physical page to one of the logical pages identified on the basis of I/O request when the I/O request is a write request, and write target data of the write request into the allocated physical page, the management computer comprising:
a storage device configured to store access path information that identifies one of the storage apparatuses that receives an I/O request in which the virtual logical volume is specified by the host computer, an actual volume response performance information of the processing target virtual logical volume, information of a volume goal response performance to be attained, page response performance information of a logical page in the virtual logical volume, and storage destination information that identifies one of the storage apparatuses in which the physical page allocated to the one of the logical pages is present; and
a control device configured to determine a target logical page of the logical pages to which data are migrated to achieve the volume goal response performance information on the basis of the access path information, the volume response performance information, the volume goal response performance information, the page response performance information and the storage destination information, and migrate data in the physical page allocated to the target logical page from the one of the storage apparatuses having the physical page allocated to the target logical page to another physical page of another one of the storage apparatuses.

14. A virtual logical volume management method for managing a virtual logical volume in a storage system including a plurality of storage apparatuses configured to provide a virtual logical volume composed of a plurality of logical pages to a host computer, receive an I/O (Input/Output) request from the host computer, allocate a physical page to one of the logical pages identified on the basis of I/O request when the I/O request is a write request, and write data being a target of the write request into the allocated physical page, the virtual logical volume management method comprising:
determining one of the logical pages that is a target of data migration to attain a volume goal response performance on the basis of access path information that identifies one of the storage apparatuses that receives an I/O request in which the virtual logical volume is specified by the host computer, an actual volume response performance of the processing target virtual logical volume, the volume goal response performance to be attained, a page response performance of the logical pages in the virtual logical volume, and storage destination information that identifies one of the storage apparatuses in which the physical page allocated to the one of the logical pages is present; and
migrating data in the physical page allocated to the target logical page from the one of the storage apparatuses having the physical page allocated to the target logical page to another physical page of another one of the storage apparatuses.

15. The virtual logical volume management method according to claim 14, further comprising:
determining one of the storage apparatuses with the largest data transfer amount for the virtual logical volume to be the one of the storage apparatuses receiving the I/O request for the virtual logical volume;

switching an access path of the host computer using the virtual logical volume to the one of the storage apparatuses;

updating information changed as a result of switching the access path among the access path information, the volume response performance information, the volume goal response performance information, the page response performance information, and the storage destination information; and then determining the target logical page and migrating the data in the physical page allocated to the target logical page.

* * * * *